US011019169B2

(12) United States Patent
Busayarat et al.

(10) Patent No.: US 11,019,169 B2
(45) Date of Patent: *May 25, 2021

(54) GRAPH FOR DATA INTERACTION

(71) Applicant: Home Box Office, Inc., New York, NY (US)

(72) Inventors: Sata Busayarat, Seattle, WA (US); Gregory John Bellingham, Seattle, WA (US); Brandon C. Furtwangler, Issaquah, WA (US); Allen Arthur Gay, Shoreline, WA (US)

(73) Assignee: HOME BOX OFFICE, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/290,224

(22) Filed: Mar. 1, 2019

(65) Prior Publication Data

US 2019/0199819 A1    Jun. 27, 2019

Related U.S. Application Data

(63) Continuation of application No. 15/291,247, filed on Oct. 12, 2016, now Pat. No. 10,277,704.
(Continued)

(51) Int. Cl.
*G06F 16/951* (2019.01)
*H04L 29/08* (2006.01)
(Continued)

(52) U.S. Cl.
CPC ........ *H04L 67/2842* (2013.01); *G06F 16/951* (2019.01); *G06T 1/20* (2013.01);
(Continued)

(58) Field of Classification Search
CPC combination set(s) only.
See application file for complete search history.

(56) References Cited

U.S. PATENT DOCUMENTS 6,025,837 A    2/2000   Matthews, III et al.
7,302,430 B1   11/2007  Nagda et al.
(Continued)

FOREIGN PATENT DOCUMENTS

EP    0 848 554 A2    6/1998
WO    97/13368 A1     4/1997
(Continued)

OTHER PUBLICATIONS

El-Ansary, Sameh, and Seif Haridi. "An overview of structured P2P overlay networks." (2006). In: Handbook on Theoretical and Algorithmic Aspects of Sensor, Ad Hoc Wireless, and Peer-to-Peer Networks / [ed] Jie Wu, Auerbach Publications , 2006 (Year: 2006).*

(Continued)

*Primary Examiner* — Yu Chen
(74) *Attorney, Agent, or Firm* — Amin, Turocy & Watson, LLP

(57) ABSTRACT

The described technology is directed towards having user interface objects rendered on a client device based upon provider data of at least part of a client provider graph. The client provider graph comprises a plurality of providers (graph nodes), in which each provider has provider data corresponding to user interface object data. The data of one provider has a reference set containing one or more references (e.g., edges) that each identify another provider, thus forming the graph. Client requests for other provider data are made based upon the reference set. The other provider data is received in response to the client requests, and is maintained at the client (e.g., in a client cache) to build the client graph.

20 Claims, 19 Drawing Sheets

Related U.S. Application Data

(60) Provisional application No. 62/240,888, filed on Oct. 13, 2015.

(51) Int. Cl.

| | | |
|---|---|---|
| H04N 21/43 | (2011.01) | |
| G06T 1/20 | (2006.01) | |
| G06T 1/60 | (2006.01) | |
| G06T 11/20 | (2006.01) | |
| H04L 29/06 | (2006.01) | |
| H04L 12/24 | (2006.01) | |
| H04L 12/26 | (2006.01) | |
| H04N 21/25 | (2011.01) | |
| H04N 21/433 | (2011.01) | |
| H04N 21/482 | (2011.01) | |

(52) U.S. Cl.
CPC .............. *G06T 1/60* (2013.01); *G06T 11/206* (2013.01); *H04L 41/5038* (2013.01); *H04L 41/5054* (2013.01); *H04L 43/045* (2013.01); *H04L 43/10* (2013.01); *H04L 65/105* (2013.01); *H04L 67/02* (2013.01); *H04L 67/10* (2013.01); *H04L 67/16* (2013.01); *H04L 67/28* (2013.01); *H04L 67/2833* (2013.01); *H04L 67/2852* (2013.01); *H04L 67/32* (2013.01); *H04L 67/34* (2013.01); *H04L 67/42* (2013.01); *H04N 21/251* (2013.01); *H04N 21/43* (2013.01); *H04N 21/4332* (2013.01); *H04N 21/4821* (2013.01); *H04N 21/4826* (2013.01)

(56) References Cited

U.S. PATENT DOCUMENTS

| | | | |
|---|---|---|---|
| 7,373,459 B2 | 5/2008 | Aoki et al. | |
| 7,620,653 B1 | 11/2009 | Swartz | |
| 7,793,206 B2 | 9/2010 | Lim | |
| 8,725,849 B1 | 5/2014 | Lloyd | |
| 8,849,825 B1 | 9/2014 | McHugh et al. | |
| 9,031,995 B1 | 5/2015 | Raden, II et al. | |
| 9,166,862 B1 | 10/2015 | Davis et al. | |
| 9,294,796 B2 | 3/2016 | McDonough et al. | |
| 9,419,852 B1 | 8/2016 | Heller et al. | |
| 9,817,646 B1 | 11/2017 | Chen et al. | |
| 9,875,262 B2 | 1/2018 | McHugh et al. | |
| 9,887,885 B2 | 2/2018 | Varney et al. | |
| 9,891,938 B2 | 2/2018 | Barry et al. | |
| 9,894,119 B2 | 2/2018 | Pearl et al. | |
| 10,042,626 B2 | 8/2018 | Nekrestyanov et al. | |
| 10,148,762 B2 | 12/2018 | Rogers et al. | |
| 10,277,704 B2 * | 4/2019 | Busayarat | H04L 67/42 |
| 10,320,879 B2 | 6/2019 | Nekrestyanov et al. | |
| 2001/0034771 A1 * | 10/2001 | Hutsch | H04L 29/12047 |
| | | | 709/217 |
| 2002/0143591 A1 | 10/2002 | Connelly | |
| 2003/0037206 A1 | 2/2003 | Benfield et al. | |
| 2003/0038836 A1 | 2/2003 | Ronald et al. | |
| 2003/0039230 A1 | 2/2003 | Ostman et al. | |
| 2003/0097357 A1 | 5/2003 | Ferrari et al. | |
| 2003/0191753 A1 | 10/2003 | Hoch | |
| 2004/0082352 A1 | 4/2004 | Keating et al. | |
| 2004/0098744 A1 | 5/2004 | Gutta | |
| 2004/0139480 A1 * | 7/2004 | Delpuch | H04N 21/654 |
| | | | 725/135 |
| 2005/0027871 A1 | 2/2005 | Bradley et al. | |
| 2005/0289168 A1 | 12/2005 | Green et al. | |
| 2006/0236221 A1 | 10/2006 | McCausland et al. | |
| 2007/0130163 A1 | 6/2007 | Perez et al. | |
| 2009/0125809 A1 | 5/2009 | Trapani et al. | |
| 2009/0138441 A1 | 5/2009 | Valentine et al. | |
| 2009/0164414 A1 | 6/2009 | Tatzel et al. | |
| 2009/0193044 A1 | 7/2009 | Buehrer et al. | |
| 2009/0282432 A1 | 11/2009 | Hahnefeld et al. | |
| 2010/0063878 A1 | 3/2010 | Bachet et al. | |
| 2010/0070447 A1 | 3/2010 | Pfuntner et al. | |
| 2010/0257204 A1 | 10/2010 | Orlov et al. | |
| 2011/0145327 A1 | 6/2011 | Stewart | |
| 2011/0246471 A1 * | 10/2011 | Rakib | G11B 27/34 |
| | | | 707/741 |
| 2011/0289458 A1 * | 11/2011 | Yu | G06F 16/41 |
| | | | 715/841 |
| 2011/0289533 A1 * | 11/2011 | White | G06F 16/41 |
| | | | 725/46 |
| 2011/0314326 A1 | 12/2011 | Mahajan et al. | |
| 2012/0197908 A1 | 8/2012 | Unno | |
| 2012/0215684 A1 | 8/2012 | Kidron | |
| 2013/0024851 A1 | 1/2013 | Firman et al. | |
| 2013/0031204 A1 | 1/2013 | Graham et al. | |
| 2013/0046849 A1 * | 2/2013 | Wolf | H04N 21/6125 |
| | | | 709/217 |
| 2013/0346539 A1 | 12/2013 | Sivasubramanian et al. | |
| 2014/0006951 A1 * | 1/2014 | Hunter | H04N 21/431 |
| | | | 715/719 |
| 2014/0040301 A1 | 2/2014 | Chadha et al. | |
| 2014/0047073 A1 | 2/2014 | Beme | |
| 2014/0181137 A1 | 6/2014 | Stein | |
| 2014/0223099 A1 | 8/2014 | Kidron | |
| 2014/0223303 A1 * | 8/2014 | Cox | H04N 21/47217 |
| | | | 715/716 |
| 2014/0280108 A1 | 9/2014 | Dunn et al. | |
| 2015/0026238 A1 | 1/2015 | Natarajan | |
| 2015/0051749 A1 | 2/2015 | Hancock et al. | |
| 2015/0149544 A1 | 5/2015 | Zhang | |
| 2016/0006645 A1 | 1/2016 | Rave | |
| 2016/0070447 A1 | 3/2016 | Righter et al. | |
| 2016/0085772 A1 | 3/2016 | Vermeulen et al. | |
| 2016/0086260 A1 | 3/2016 | Vermeulen et al. | |
| 2016/0105710 A1 * | 4/2016 | Watson | H04N 21/4147 |
| | | | 725/28 |
| 2016/0110412 A1 | 4/2016 | Sun et al. | |
| 2016/0140002 A1 | 5/2016 | Fee et al. | |
| 2016/0337426 A1 | 11/2016 | Shribman et al. | |
| 2017/0006036 A1 | 1/2017 | Bellingham | |
| 2017/0032005 A1 | 2/2017 | Zheng et al. | |
| 2017/0041296 A1 | 2/2017 | Ford et al. | |
| 2017/0103553 A1 | 4/2017 | Busayarat et al. | |
| 2017/0104838 A1 | 4/2017 | Busayarat et al. | |
| 2017/0105049 A1 | 4/2017 | Busayarat et al. | |
| 2017/0177333 A1 | 6/2017 | Busayarat et al. | |
| 2017/0323028 A1 | 11/2017 | Jonker et al. | |
| 2018/0039647 A1 | 2/2018 | Winstanley et al. | |
| 2018/0060248 A1 | 3/2018 | Liu et al. | |
| 2018/0131633 A1 | 5/2018 | Li | |
| 2019/0095395 A1 | 3/2019 | Piecko | |

FOREIGN PATENT DOCUMENTS

| | | |
|---|---|---|
| WO | 2007/054687 A1 | 5/2007 |
| WO | 2011/102824 A2 | 8/2011 |
| WO | 2017004138 A1 | 1/2017 |

OTHER PUBLICATIONS

International Search Report and Written Opinion received for International Application Serial No. PCT/US2016/056755 dated Dec. 19, 2016, 15 pages.
Non-Final Office Action received for U.S. Appl. No. 15/285,439 dated Jul. 27, 2017, 27 pages.
Notice of Allowance received for U.S. Appl. No. 15/252,166 dated Mar. 22, 2018, 40 pages.
Final Office Action received for U.S. Appl. No. 15/285,439 dated Feb. 2, 2018, 23 pages.
El-Ansary et al., "An Overview of Structured P2P Overlay Networks," In: Handbook on Theoretical and Algorithmic Aspects of Sensor, Ad Hoc Wireless, and Peer-to-Peer Networks 1 led] Jie Wu, Auerbach Publications, 2006, 27 pages.
Non-Final Office Action received for U.S. Appl. No. 15/291,247 dated Jun. 14, 2018, 70 pages.
Non-Final Office Action received for U.S. Appl. No. 15/290,722 dated Jun. 28, 2018, 29 pages.

(56) References Cited

OTHER PUBLICATIONS

First Office Action received for Colombian Patent Application Serial No. NC2018/0005094 dated Aug. 22, 2018, 3 pages (including English translation).
Non-Final Office Action received for U.S. Appl. No. 15/285,439 dated Jul. 25, 2018, 32 pages.
European Office Action received for EP Patent Application Serial No. 16787677.0 dated May 30, 2018, 3 pages.
Chinese Office Action received for Chinese Patent Application Serial No. 201690001472.1 dated Aug. 17, 2018, 2 pages.
Non-Final Office Action received for U.S. Appl. No. 15/291,810 dated Nov. 19, 2018, 43 pages.
Final Office Action received for U.S. Appl. No. 15/285,439 dated Jan. 30, 2019, 41 pages.
International Search Report and Written Opinion received for International Application Serial No. PCT/US2018/030717 dated Aug. 7, 2018, 16 pages.
Final Office Action received for U.S. Appl. No. 15/290,722 dated Feb. 25, 2019, 33 pages.
Communication pursuant to Article 94(3) EPC received for EP Patent Application Serial No. 16787677.0 dated Mar. 13, 2019, 8 pages.
Non-Final Office Action received for U.S. Appl. No. 15/584,142 dated Apr. 29, 2019, 144 pages.
Notice of Allowance received for U.S. Appl. No. 16/054,278 dated Dec. 18, 2019, 58 pages.
Final Office Action received for U.S. Appl. No. 15/584,142 dated Nov. 6, 2019, 155 pages.
International Search Report and Written Opinion for International Application Serial No. PCT/US2019/055851 dated Nov. 22, 2019, 13 pages.
Summons to attend oral proceedings pursuant to Rule 115(1) EPC received for EP Application Serial No. 16787677.0 dated Dec. 6, 2019, 7 pages.
Non-Final Office Action received for U.S. Appl. No. 15/290,722 dated Sep. 9, 2019, 23 pages.
Non-Final Office Action received for U.S. Appl. No. 15/285,439 dated Jul. 25, 2019, 39 pages.
Second Office Action received for Colombian Application Serial No. NC2018/0005094 dated Jul. 4, 2019, 30 pages (with English translation).
Non-Final Office Action received for U.S. Appl. No. 15/449,229 dated Jun. 28, 2019, 52 pages.
Notice of Allowance for U.S. Appl. No. 15/291,810 dated Apr. 22, 2019, 22 pages.
Notice of Allowance received for U.S. Appl. No. 15/584,142 dated Feb. 21, 2020, 30 pages.
Non-Final Office Action received for U.S. Appl. No. 16/561,572 dated Sep. 23, 2020, 45 pages.
Decision to refuse a European Patent application received for European Patent Application Serial No. 16787677.0 dated Jul. 22, 2020, 26 pages.
Non-Final Office Action received for U.S. Appl. No. 16/157,649 dated Jan. 19, 2021, 86 pages.

\* cited by examiner

GRAPH FOR DATA INTERACTION

CROSS-REFERENCE TO RELATED APPLICATION

The present application is a continuation of U.S. patent application Ser. No. 15/291,247 filed Oct. 12, 2016, which claims priority to U.S. provisional patent application Ser. No. 62/240,888, filed Oct. 13, 2015, the entirety of which are hereby incorporated herein by reference.

BACKGROUND

Client users interact with information via user interfaces, such as menus of data items (e.g., buttons, tiles, icons and/or text) by which a client user may make a desired selection. For example, a client user may view a scrollable menu containing data items representing video content, such as movies or television shows, and interact with the menu items to select a movie or television show for viewing.

A lot of information may be made available to client users, and some of the information may be based upon relatively complex interrelationships. In a video selection-related example, in addition to a movie's title, a movie's associated data may include a rating, an image that represents the movie, a plot summary, cast and crew information, reviews and so on, which a user may wish to have. Indeed, a user may not simply want to find a movie and then play it, but instead may want to interact with a movie's data to find something else. For example, a client user may want to look up a particular actor who appeared in one movie and use that actor's information to find other movies in which the actor appeared. While a movie's main cast may be shown as text names to a requesting user, a more useful user interface may list the names of the various actors, each in the form of an interactive link to that actor's filmography or the like.

In general, client users want relatively large amounts of information from a data service, with the ability to interact over possibly complex interrelationships. However, the underlying data may reside in various data sources, and in general are not maintained in a way that corresponds to the structure and/or the complex interrelationships that clients may desire.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards a client provider graph comprising a plurality of providers (graph nodes), in which each provider has provider data. Aspects include accessing the data of one provider that has a reference set containing one or more references (e.g., edges) that each identify another provider, making a client request for other provider data corresponding to provider or providers identified in the reference set, and receiving the other provider data in response to the client request. One or more user interface objects are rendered based upon provider data of at least part of the client provider graph.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
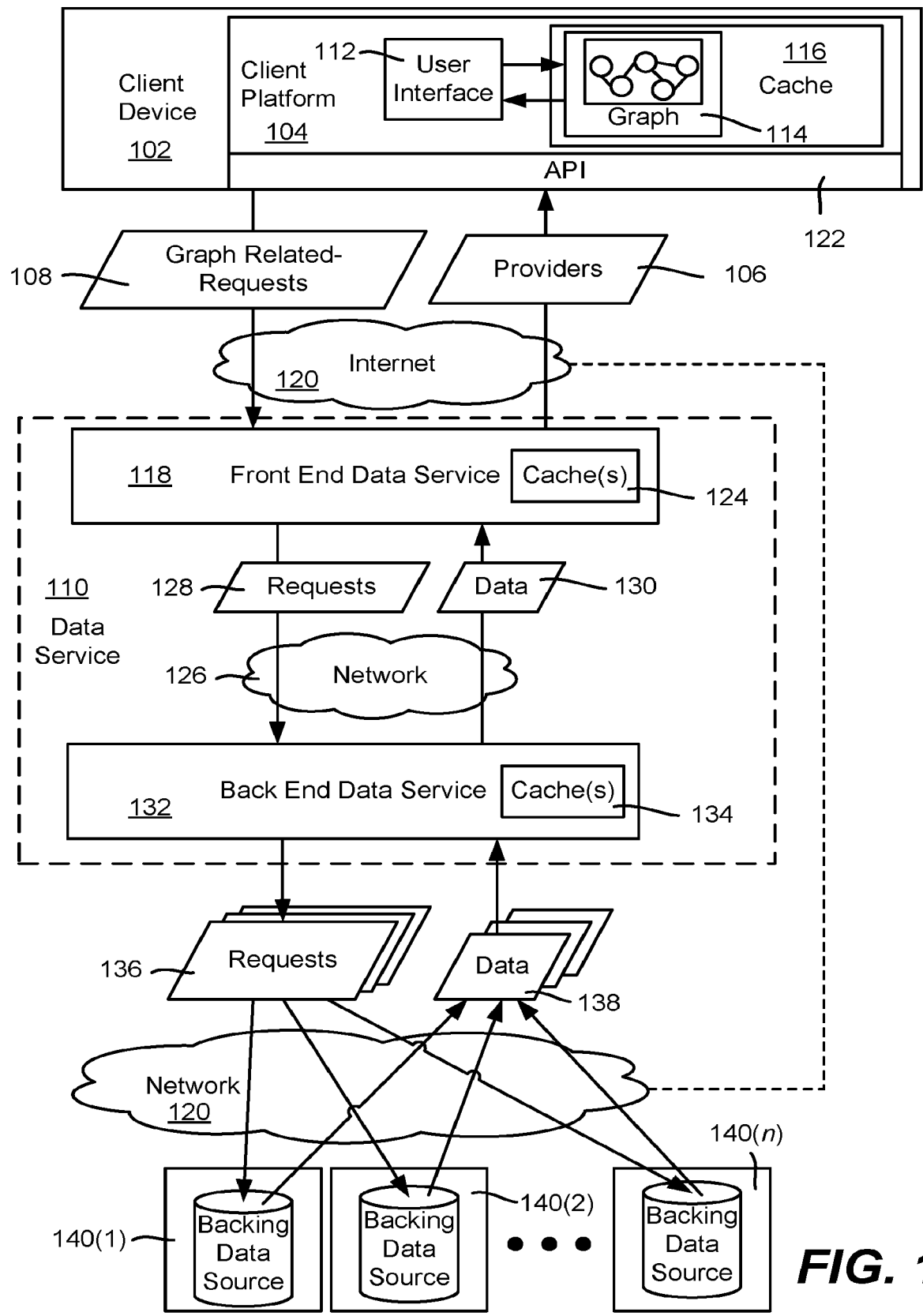
FIG. 1 is an example block diagram representation of a client device communicating with a data service to obtain data corresponding to a graph with which a client user may interact, according to one or more example implementations.

Various aspects of the technology described herein are generally directed towards maintaining various data for client interaction as a graph of nodes and edges. In general, a graph is built by each client, in which each graph node (referred to as a "provider" in the client device) represents a part of the underlying data that is available via a data service; (as used herein a "graph" is formed by the relationships between providers or provider data structures, regardless of whether visibly represented as nodes and edges). The set of providers for a given client includes a subset of the available data service's data that are currently relevant to that client, e.g., those which the client user interface displays. The edges between nodes model the relationships between the various providers.

To build the client graph, in addition to the data properties/attributes maintained in a provider, a provider's data also may include edge references to other providers, as well as possibly more specific relationship information, e.g., indicative of a child or parent relationship to another provider. The client platform software follows these references to obtain more providers as needed. For example, if a provider A, such as representing a menu, references two child providers B and C, then when provider A is to be rendered as a user interface menu object, the data is obtained for providers B and C so that they can be rendered as UI objects that are part of the A menu, and so on. If a client interacts to select item B, e.g., a sub-menu object of menu A, then the provider data for sub-menu B including B's referenced providers are requested and obtained so that menu object B and its referenced provider objects can be rendered. Note that one or more providers may be returned from the data service in anticipation of their likely being needed rather than waiting for an actual need. Further, once obtained, providers may be cached at the client so that they may be quickly accessed from the client cache rather than obtained via another (e.g., internet) request to the data service.

In general, providers have an identifier (ID) that is unique to the data service, and indeed may be globally unique. One or more implementations use a Uniform Resource Name (URN); (e.g., urn:hbo:menu:root) as the identifier. Providers are typed; (note that in one scheme, the type of provider also may be determined from its URN) each provider implements a model with a model interface that defines the schema/shape of the provider's data. For example, with respect to video content, there may be a provider of type "feature" that represents some streaming video content and includes a title, a URL to an image, a rating (if known), and so forth. As another example, a provider of type "user" may represent a client user, and may have per-user data such as a username, parental controls (such as maximum rating allowed), a "watch-list" of user-specified (and/or for example machine-learned favorite) shows of particular interest or the like, and so forth. Via the user provider, each different client user can have a per-user customized graph portion.

Thus, based upon user interaction as well as automated processes, using the graph of provider relationships, a client software platform makes requests for one or more providers to obtain their data as needed. The client requests may be to a request handling portion of a data service, e.g., a client interfacing front-end data service coupled to the client via the internet. The front-end data service interprets each request and responds with the requested data, which in one or more implementations may be obtained from a front-end cache, or via a back-end data service, including from a back-end cache and/or backing data sources. In this way the client software builds relevant portion(s) of the client graph as needed, which in general is highly efficient with respect to resource usage and obtaining rapid responses. Note that providers may be cached at the client as described herein, and thus when data is needed the client platform may first attempt to use client-cached data without making a request to the request handling portion of the data service.

As will be understood, the underlying data are generally not maintained in graph form at their source(s), e.g., the backing data sources coupled to the back-end data service, although it is feasible to do so. Moreover, requested provider data may need to be built from various sub-parts of data items, which may be stored at different locations, such as a title sub-part from a key-value store, a cast and crew sub-part from a database, and so on. Thus, aspects of the technology described herein may be directed towards composing and processing at least some data sub-parts into a provider that the client software platform understands and can incorporate into a client graph.

It should be understood that any of the examples herein are non-limiting. For instance, some of the examples refer to data related to client selection of video content (including audio) from a streaming service that delivers movies, television shows, documentaries and the like. However, the technology described herein is independent of any particular type of data, and is also independent of any particular user interface that presents the data as visible representations of objects or the like. Thus, any of the embodiments, aspects, concepts, structures, functionalities or examples described herein are non-limiting, and the technology may be used in various ways that provide benefits and advantages in data communication and data processing in general.

FIG. 1 is a block diagram representing example components that may be used to handle client requests for providers (graph nodes) based upon a client graph. As exemplified in FIG. 1, a client device 102 runs client platform software 104 that receives providers 106, including via graph-related requests 108, from a data service 110. Note that the client device 102 initially may receive one or more starting providers corresponding to typed nodes automatically, e.g., when the client user of the client device 102 authenticates with the data service 110. For example, when the user logs in on the client device 102, the client device 102 may receive a user provider, a root provider and so forth that the client platform software 104 expects upon successful authentication. In this way, the client platform 104 may present initial user interface elements by rendering a root menu or the like based upon the root provider, such as a home/root menu, with buttons, icons, tiles and so forth by which a user can navigate to other locations. Note that because in one or more implementations the root provider is the starting point for an interactive user interface 112, in addition to the root provider one or more providers referenced by the root provider may be automatically communicated to the client in advance. Note however that this is only one possible optimization, and alternatively the client device may be configured to make requests for any needed data, including the root provider at start up, as well as providers that are children of the root provider, and so on.

In one or more implementations, the client software program's UI elements or the like may make requests for data items to the client platform (e.g., at a data service level)

without needing to know about providers or how the underlying data is maintained, organized, retrieved and so forth. For example, a tile object that represents a television show may in a straightforward manner send a request to the client platform software for a title corresponding to a title ID (which in one or more implementations is also the provider ID), and gets the title back. As will be understood, beneath the UI level, the client platform software obtains the title from a (feature type) provider corresponding to that ID; the provider data may be obtained from a client cache, but if not cached, by requesting the provider from a data service, as described herein.

As set forth above, each provider may reference one or more other providers, which forms a graph 114 (e.g., generally maintained in a client cache 116 or other suitable data storage). The client graph 114 is built by obtaining the data for these other providers as needed, such as when providers are rendered as visible representations of objects on the interactive user interface 112. Example visible representations of provider data may include menus, tiles, icons, buttons, text and so forth.

In general, the client graph 114 comprises a client-relevant subset of the overall data available from the data service 110; (the available data at the data service can be considered an overall virtual graph). Because in the client platform 104 the underlying data forms the client graph 114, at least part of which are typically represented as elements on the user interface 112, a user can interact to receive data for any relationship that the data service 110 (e.g., of the streaming video service) has decided to make available, including relationships between very different kinds of data, and/or those that to some users may seem unrelated. Over time the data service 110 can add, remove or change such references as desired, e.g., to link in new relationships based upon user feedback and/or as new providers and/or provider types become available.

To obtain the providers 106, the client platform 104 interfaces with the data service 110, e.g., via a client interfacing front-end data service 118, over a network such as the internet 120. An application programming interface (API) 122 may be present that may be customized for devices and/or platform software versions to allow various types of client devices and/or various software platform versions to communicate with the front-end data service 118 via a protocol that both entities understand.

The front-end data service 118 may comprise a number of load-balanced physical and/or virtual servers (not separately shown) that return the requested providers 106, in a manner that is expected by the client platform software 104. Some of the requests for a provider may correspond to multiple sub-requests that the client platform software 104 expects in a single provider; for example, a request for a tile provider that represents a feature (movie) may correspond to sub-requests for a title (in text), an image reference such as a URL, a rating, a plot summary and so on. A request for a user's "watch list" may correspond to sub-requests for multiple tiles. The data service 110 understands based upon each provider's type how to obtain and assemble data sub-parts as needed, from possibly various sources, into a single provider to respond to a client request for a provider.

The corresponding provider may be contained in one or more front-end caches 124, which allows like requests from multiple clients to be efficiently satisfied. For example, each load-balanced server may have an in-memory cache that contains frequently or recently requested data, and/or there may be one or more front-end caches shared by the front-end servers. The data is typically cached as a full provider (e.g., a tile corresponding to data from multiple sub-requests), but it is feasible to cache at least some data in sub-parts that are aggregated to provide a full provider.

Some or all of the requested data may not be cached (or may be cached but expired) in the front-end cache(s) 124. For such needed data, in one or more implementations, the front-end data service 118 is coupled (e.g., via a network 126, which may comprise an intranet and/or the internet) to make requests 128 for data 130 to a back-end data service 132.

The back-end data service 132 similarly may comprise a number of load-balanced physical and/or virtual servers (not separately shown) that return the requested data, in a manner that is expected by the front-end data service 118. The requested data may be contained in one or more back-end data caches 134. For example, each load-balanced back-end server may have an in-memory cache that contains the requested data, and/or there may be one or more back-end caches shared by the back-end servers.

For requests that reach the back-end data service 132 but cannot be satisfied from any back-end cache 134, the back-end data service 132 is further coupled (e.g., via an intranet and/or the internet 120) to send requests 136 for data 138 to one or more various backing data sources 140(1)-140($n$). Non-limiting examples of such data sources 140(1)-140($n$) may include key-value stores, relational databases, file servers, and so on that may maintain the data in virtually any suitable format. A client request for provider data may correspond to multiple sub-requests, and these may be to backing data sources; the data service 110 is configured to make requests for data in appropriate formats as needed to the different backing data sources 140(1)-140($n$). Moreover, one data store's data may override another data store's data; e.g., the data for a television show may include a generic image URL obtained from one data store, however an "editorial"-like data store may override the generic image with a different image, such as for some uncharacteristic episode. Note that in one or more implementations, non-cache data sources 140(1)-140($n$) may use a wrapper that implements a common cache interface, whereby each remote data source 140(1)-140($n$) may be treated like another cache from the perspective of the back-end data service 132.

Figure 2:
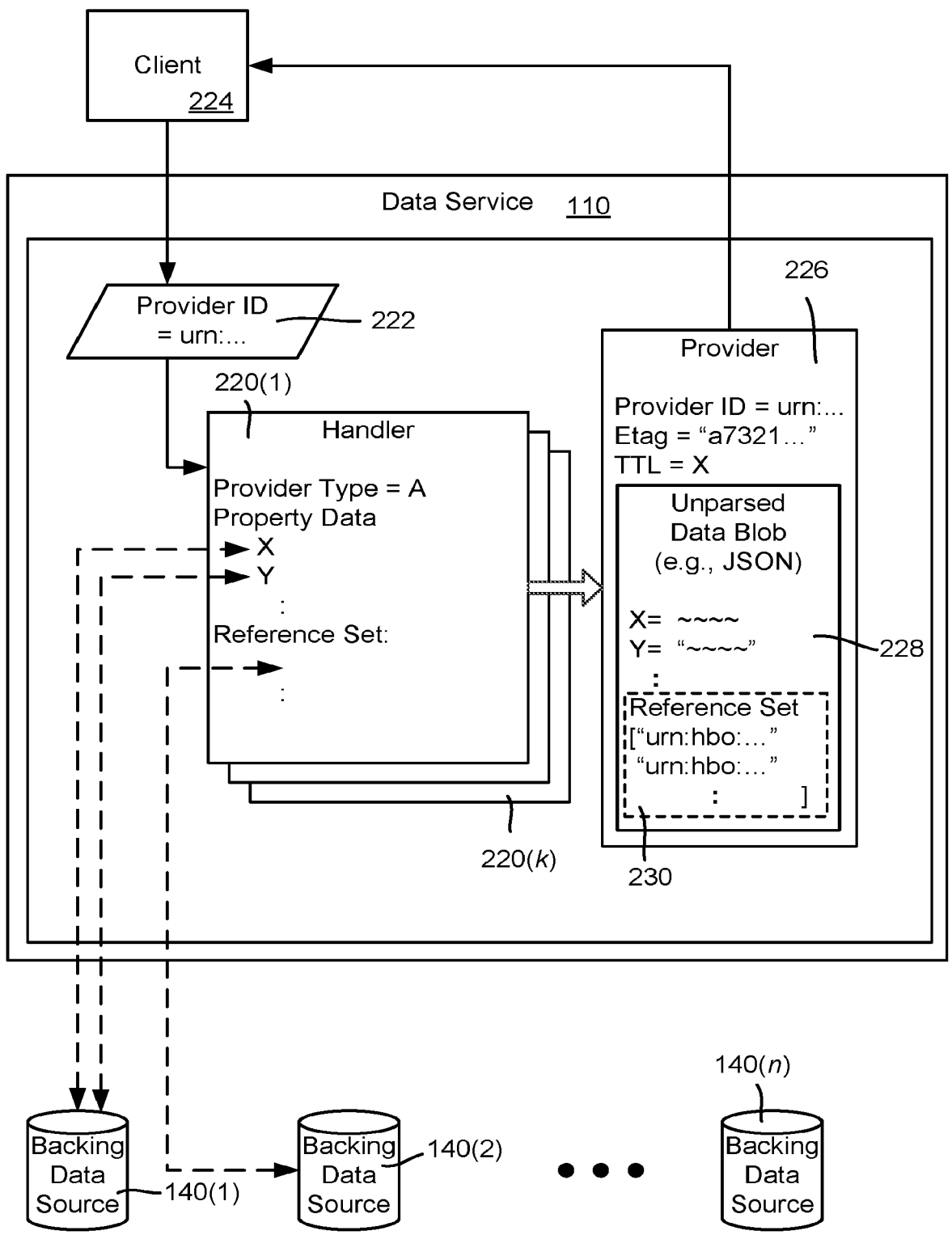
FIG. 2 is a representation of example data service handlers that retrieve and return client-requested data according to one or more example implementations.

FIG. 2 shows handlers 220(1)-220($k$) of the data service 110 that obtain the data for each handler's respective provider type, based upon the provider ID, from one or more of the backing data sources 140(1)-140($n$). In general, a handler is selected based upon the URN (although a "type ID" may be used in alternative implementations); each handler knows the parts of its provider type and which backing data source maintains each part. For example, the handler that returns a feature-type provider when given a provider ID may obtain the title from one backing data source, the rating (if any) from (possibly) another backing data source, a URL to an image that represents the feature from (possibly) another backing data source, the reference set of one or more references to other provider(s) from (possibly) another backing data source, and so on. At least some of these data may be overridden by data from another data source.

Thus, given a provider ID, the type is determined, and the handler for that type selected. The handler obtains the needed data, and returns the data in an unparsed form, e.g., as a JavaScript® Object Notation, or JSON data blob, along with an ETag (entity tag) value and an expiration value (TTL, typically a date/timestamp) in one or more implementations. In FIG. 2 this is exemplified as the handler 220(1) handling a provider request 222 for a specific provider ID from a client 224 by obtaining property data from the backing data source 140(1) and the reference set from backing data source 140(2), and returning a provider 226 including the provider data body 228 with the property data and the completed reference set 230 to the requesting client 224. In one or more implementations, the provider knows how to parse its unparsed data into an object format.

As is understood, the handler-based retrieval mechanism allows for straightforward changes to be made. For example, if data is moved among the sources or a new data source added, the appropriate-type handler(s) are updated. For example, if the title and rating were in separate data sources but now are stored together in a single data source, the feature-type handler may be updated to get these items together in a single request. A handler also knows which data source or sources override which other data source or sources.

As described herein, with the provider model, at least some of the providers include a reference set as part of their data, comprising one or more references to other providers by which the client graph is formed. Other provider data may include (mostly) static data and/or variable data. Thus, the underlying data determines the client graph as well as the information presented on the client user interface, whereby changes made to the data change the user experience without having to modify the data service code or the client platform code. For example, if a designer decides that the root menu is to now offer a "Genre" button by which a user can navigate to a "Genre" menu, (if not previously offered), then the root menu provider's underlying data (its reference set) only needs to be modified to include a reference to a "Genre" menu provider. The data service (via an appropriate handler) obtains and returns a provider's data including its reference set based upon whatever information is maintained in the underlying data source, typically without having to change the handler code. Similarly, a feature can link to a provider to which the provider was not previously linked by changing reference set(s); e.g., a movie that was originally considered a serious movie can be linked to a comedy menu provider because many viewers instead found the movie to be comical. Links can be similarly removed by editing the reference set data.

Figure 3:
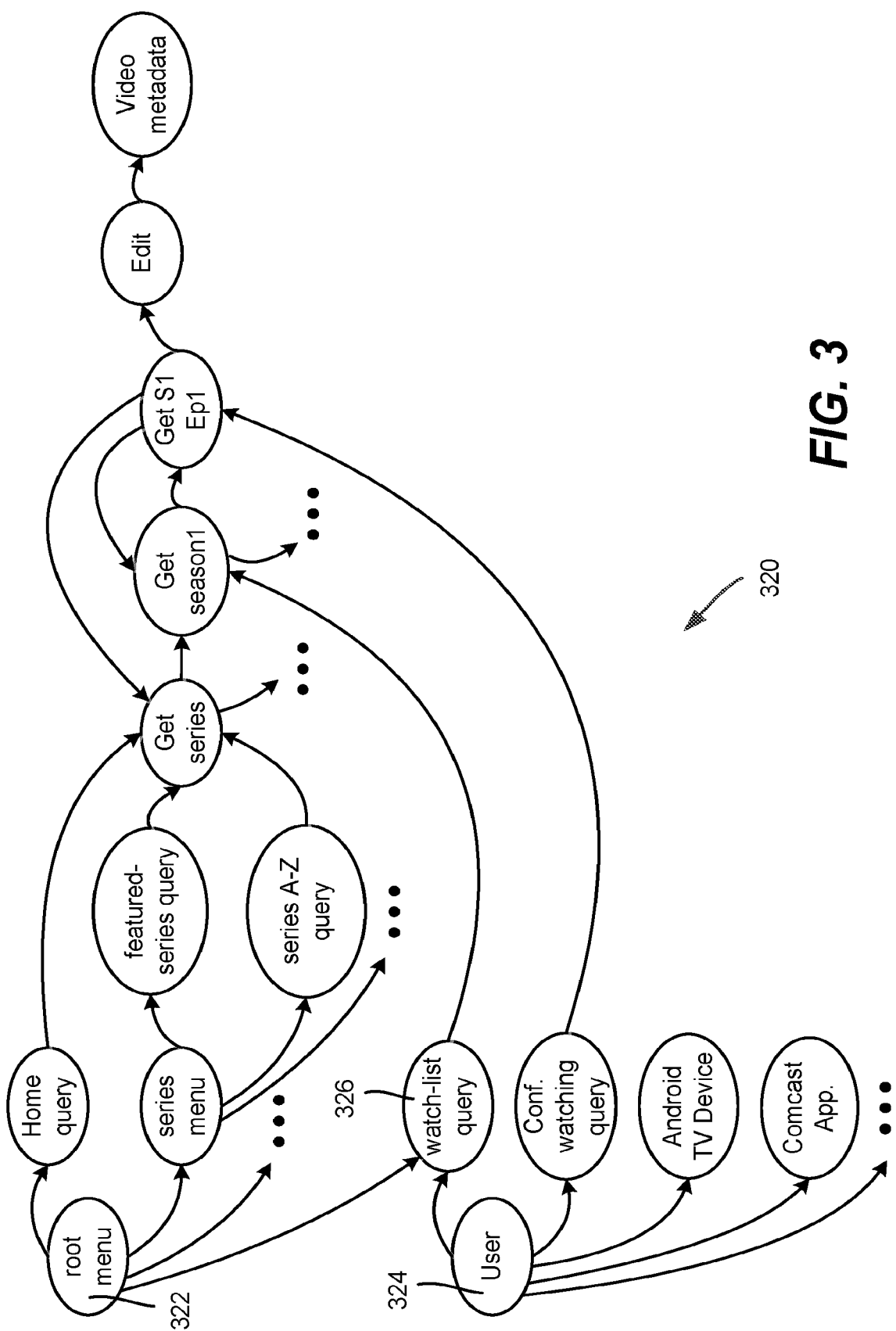
FIG. 3 is a representation of part of an example client graph of nodes (providers) according to one or more example implementations.

FIG. 3 shows an example partial graph representation 320 comprising providers (nodes) including a root menu provider 322 and a user provider 324, along with various child providers. As can be seen, in one or more implementations the providers may include menus, query nodes for obtaining specific data and "Get" type nodes such as for getting the feature providers corresponding to a series. In this example graph representation 320, the root menu provider 322 and the user provider 324 both link to the specific user's watchlist query provider 326, and thus the root menu presents a tile or the like for the client user to navigate to a menu or the like containing that user's specific data of interest, e.g., including the user's favorite series tiles.

Figure 4:
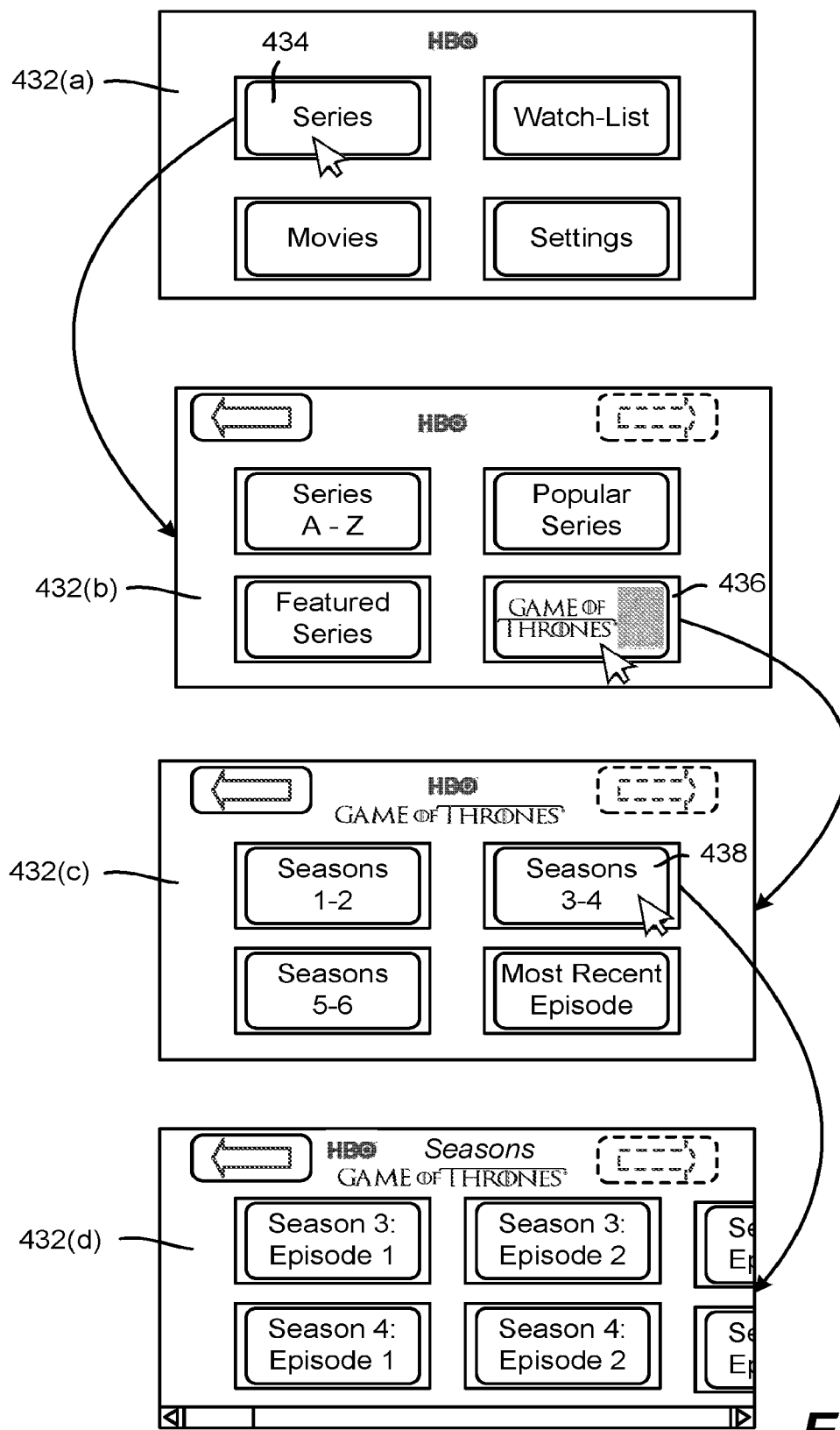
FIG. 4 is an example of a user interface with which a user may interact to submit requests based upon a graph to obtain more interactive data for selection, according to one or more example implementations.

FIG. 4 shows a hypothetical user interface of various menus objects 432(a)-432(d) that for example may be based upon some data that is part of the example graph representation 320 of FIG. 3. As can be seen, the root menu 432(a) (e.g., corresponding to the root menu provider 322 of FIG. 3) provides a number of interactive buttons, which may be interactive tiles (possibly including information beyond text) that link to menus or other information. In this example, from the root menu 432(a), the user interacts with a tile or button 434 to select "Series", which navigates to a series menu 432(b). From there, the user selects the "Game of Thrones" via tile 436, which navigates to a "Game of Thrones" series menu 432(c) showing buttons/tiles to available seasons including the button/tile 438 for seasons 3 and 4. The user then navigates to a Game of Thrones, Seasons 3 and 4 menu 432(d), from which the user may interact to select a desired episode. Thus, as a user navigates, more providers and their data are retrieved as needed.

As is understood, each menu object and tile (or button) object may correspond to a provider's data, which may be made up of multiple component parts. For example, the menu provider for the menu 432(b) contains tiles or buttons, including an example tile 436 that may obtain its data from a feature type provider, which includes sub-parts comprising text and a representative image URL or the like, as well as possibly other sub-parts.

Note that some provider data (e.g., text representing a feature's title) may be known to be retrieved more rapidly than other data of that provider in typical situations. To take advantage of this, a provider node in the graph such as representing a tile may be broken up (at least temporarily) into one or more virtual nodes, so that partial data may be presented to the user even if not all data is yet received for the provider node. For example, in FIG. 4, the "Game of Thrones" tile 436 may have the text returned and presented to the user for possible interaction before the image data for the tile 436 can be received and rendered.

Turning to another aspect, providers may be cached at the client, and moreover, in one or more implementations, providers may be retrieved from the data service in anticipation of their need. Rules and/or other decision making processes (e.g., based upon machine learning) may be used to decide whether to expand a query to request such anticipated data. For example, in FIG. 4 when the data corresponding to the "Game of Thrones" tile 436 was retrieved for presenting on the menu 432(b), at least some of the data for the seasons/most recent episode to be presented on the menu 432(c) may be requested in anticipation of the user selecting the "Game of Thrones" tile 436.

Figure 5:
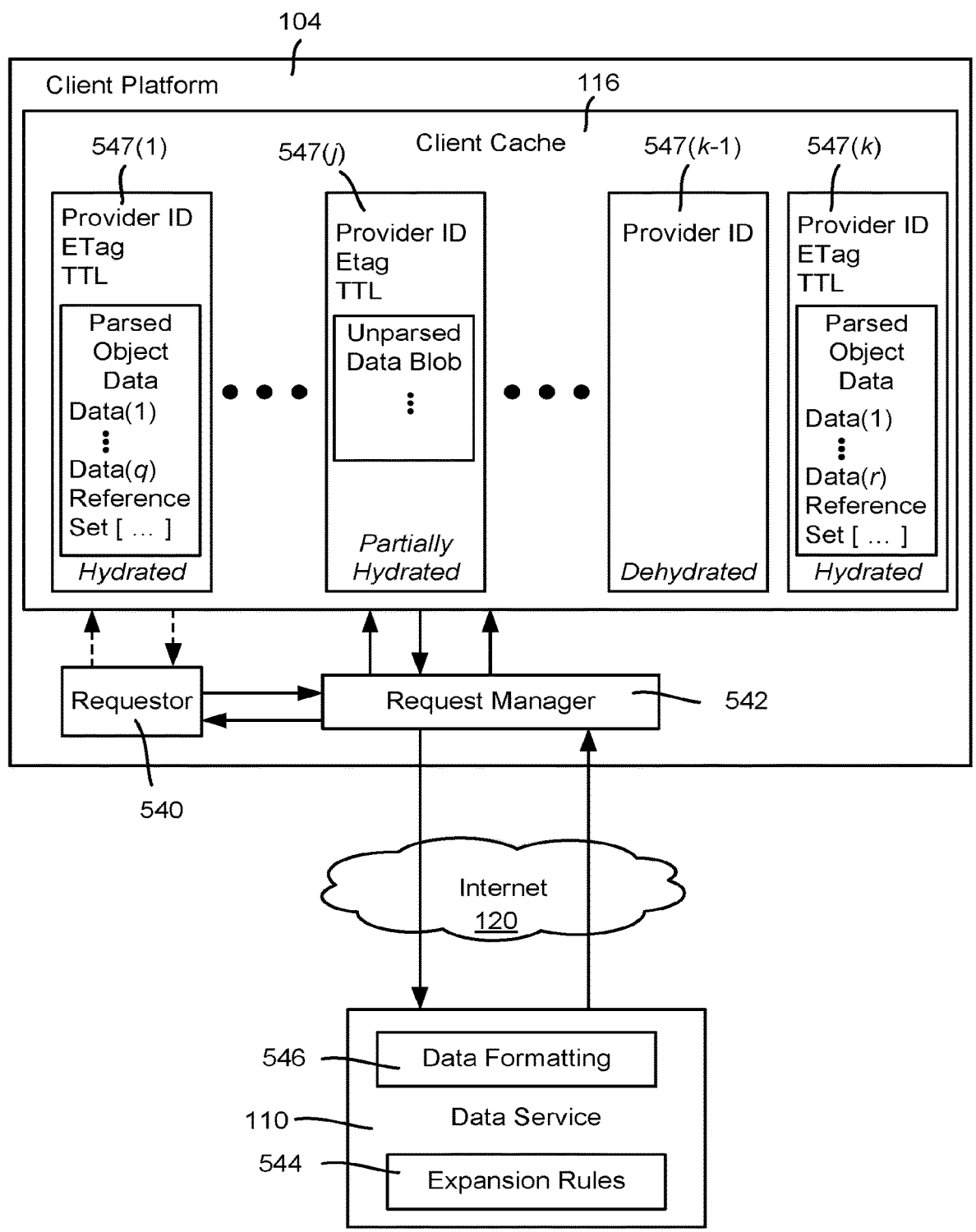
FIG. 5 is an example of a client cache containing information corresponding to providers and data in various states, according to one or more example implementations.

FIG. 5 shows an example of some data that may be maintained in the client cache 116 to represent providers in the graph. In general, the client platform 104 includes or is coupled to the cache 116. In one alternative implementation, a requestor 540 passes its request to a request manager 542 that first checks the cache 116 to determine whether the needed data is in the cache 116. If so, and the data is not considered expired, the request manager 542 uses the data from the cache 116 to respond to the request. In another alternative implementation the requestor 540 itself may check the cache 116 (represented by the dashed arrows between the requestor 540 and the cache 116), and only pass a request for the data to the request manager 542 if the data is not found or is considered expired in the cache 116.

For requests not satisfied via the cache 116, the request manager 542 communicates (e.g., via the internet 114) with the data service 110 (the client facing front-end 118) to obtain the requested data. One example request manger 542 that also may perform batching and multiplexing operations is described herein with reference to FIGS. 6-8.

The exemplified data service 110 may include expansion rules 544, which, if applicable to a given request, may expand the request into a larger query in anticipation of more data being desired than is currently being requested. In general, if expansion applies, at least one more provider than requested is returned. The data service 110 also may include a data formatting mechanism 546 that formats and shapes the data response into what the client device and/or software platform version expect with respect to the request.

In the example implementation of FIG. 5, each exemplified cache entry 547(1)-547(n) includes a data service-unique provider identifier (ID) that corresponds to a key to any associated value (data) in the store maintained for that provider in the cache location. For example, the provider ID may be used by a hash function to determine the key/cache location, e.g., in a hash-mapped cache. Not all cache locations may have data therein.

In general, in one or more implementations, on the client device a provider corresponds to an object that is instantiated with its data when needed in the client graph. However a provider may be "instantiated" without having its data retrieved, or a provider may have its data retrieved but not yet parsed into object form. Thus, in one or more implementations, a provider may be maintained in the client cache 116 one of multiple (e.g., three) different states.

One possible state, referred to as a dehydrated state, is shown for entry 547(k−1), in which the provider is known to exist but the data for that provider has not yet been retrieved. For example, before a request is made some of the providers in the graph may be known based upon a reference from at least one other provider, and such a reference may be used to set up an entry in the client cache 116. If not already set up, when a request is made from the request manager 542 to the data service 110, the provider ID may be added to the cache 116. For example, in one or more implementations, a client request for provider data may have an asynchronous promise for that data initially returned (wherein a "promise" in asynchronous programming environments is basically a placeholder in which data is returned when ready, sometimes referred to as a "future" or "delay"). For such a promise, the provider ID may be placed in the cache 116, with the data later made available in the cache 116 and used when actually received and the promise resolved. Note that for a dehydrated entry such as the entry 547(k−1), an expiration value (e.g., date/timestamp or time-to-live/TTL value) may be present by default or the entry otherwise flagged in some way so as to not evict the provider ID from the cache 116 too quickly.

Another state, referred to as a hydrated state, is shown for entries 547(1) and 547(k). In the hydrated state, the provider data is present and ready for use in the graph, that is, the provider data that had been obtained (as an unparsed data blob such as a JSON object) has been thereafter parsed from the unparsed form into a useable object form in the cache 116. When a client request for a provider's data is processed, the cache 116 is accessed and the corresponding provider data returned if the provider is cached in the hydrated state (and not considered expired).

Yet another state is a partially hydrated state, shown for cache entry 547(j). More particularly, in an implementation in which a provider may be received in anticipation of its need, e.g., via the expansion rules 544, the data may be cached as received, e.g., as an unparsed data blob (e.g., a JSON object). In such an implementation that uses a partially hydrated state, only if and when the data is actually needed for a client request is a partially hydrated cache entry parsed (e.g., by provider code) into a hydrated cache entry in object form for use by the requestor 540. This optimization is not necessary, but when used, avoids the computational expense of parsing a provider data blob into the object format unless and until the provider's hydrated object data is needed.

Figure 6:
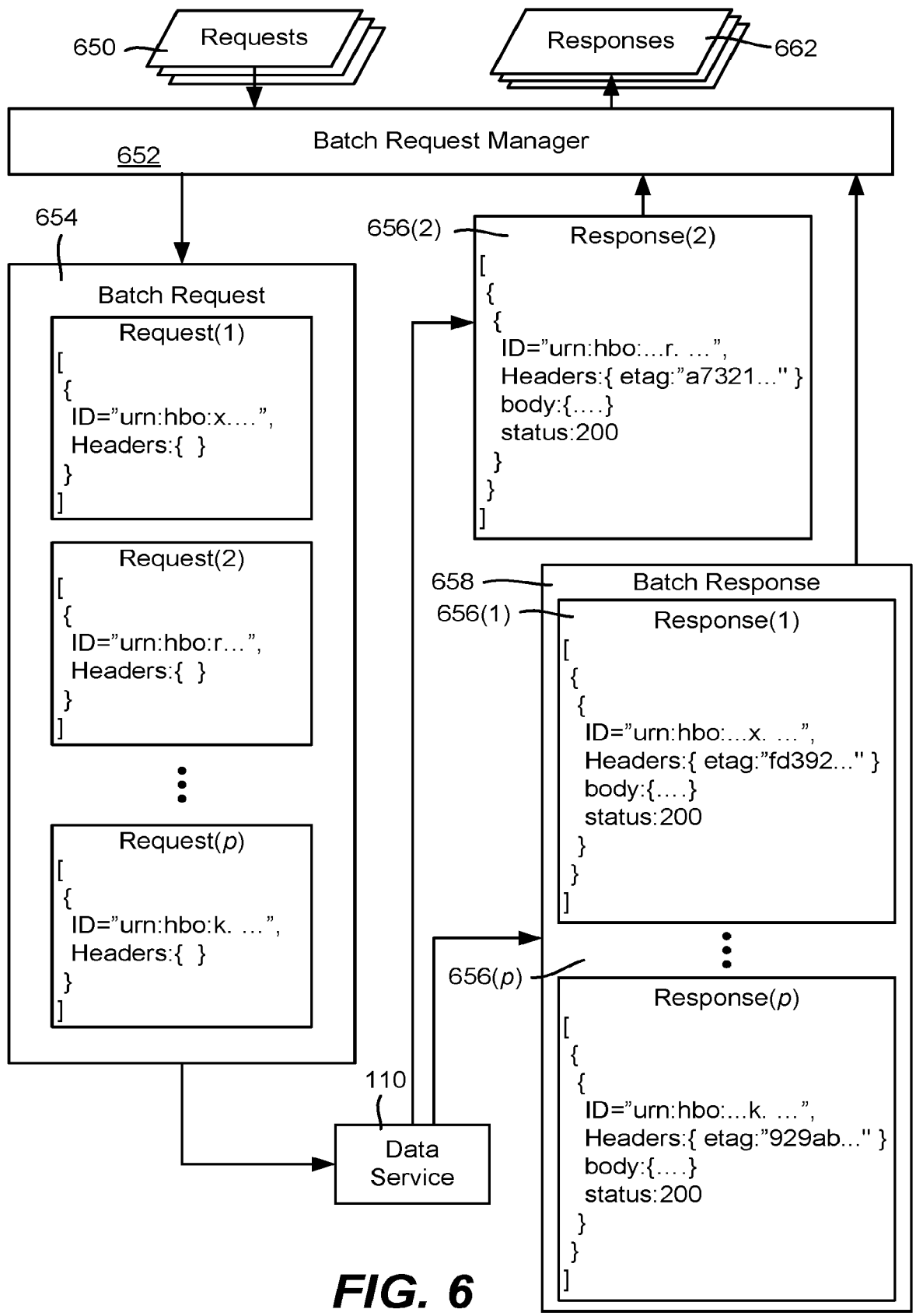
FIG. 6 is an example representation of how client requests to a data service may be batched with streamed responses returned, according to one or more example implementations.

Turning to another aspect, in one or more implementations client requests for a provider (and possibly other data) may be batched for efficiency. Batching may be performed by the client platform software, e.g., at a client data access layer below the user interface part of the client platform. For example, the client request manager 542 of FIG. 5 may comprise a batch request manager 652 as represented in FIG. 6, and may perform batching operations as described herein. For further efficiency, the batch request manager 652 also may perform request multiplexing, which in general eliminates multiple (e.g., duplicate) requests for the same data, by sending a single request, and de-multiplexing the single response into multiple responses, one to each multiple requesting entity.

By way of example, as represented in FIG. 6, client data requests 650 may be independently seeking pieces of data generally at the same time, and such requests may be batched by the batch request manager 652. For example, a client requestor such as a UI element may be a tile object that requests a title, rating, image URL and so forth in a one or more requests or a combined request for a single provider's data. As another example, a menu object requestor may request set of tiles to present on its menu object rendering, and each tile may correspond to a request for feature provider; such a request may be batched when made and received as a batch request at the batch request manager. Thus, multiple single and/or batch requests for provider data may be made to the batch request manager 652, which the batch request manager 652 can combine into a batch request (or batch requests) for sending to the data service 110. In general, sending batch requests to the data service 110 is more efficient than sending single requests.

Moreover, the same data may be independently requested at generally the same time by different client requestors. For example, a button and a tile may seek the same provider data (e.g., an image URL) without any knowledge of the other's request. Request multiplexing at the batch manager 652 allows for combining such independent requests for the same provider into a single request for a provider to the data service 110, with the provider data from the single response returned separately (de-multiplexed) to each requestor.

In one or more implementations, the batch request manager 652 may batch up to some maximum number of requests over some defined collection time. For example, a batch request to the data service 110 may range from one request up to some maximum number of (e.g., sixteen or thirty-two) requests per timeframe, such as once per user interface rendering frame. If more than the maximum number requests are received within the timeframe, then multiple batch requests are sent, e.g., at the defined time such as once per rendering frame, although it is feasible to send a batch as soon as a batch is full regardless of the defined time. The request and response may be in the HTTP format, e.g., using a REST-like API.

As generally represented in FIG. 6, although the batch request manager 652 batches multiple requests 650 (when possible) into a single batch request 654, the requests may be processed at the data service 110 as if independently streamed. Thus, in one or more implementations, individual and/or batched responses may be streamed back by the data service 110 to the batch request manager 652, that is, as a full batch response, or in multiple sets of partial results, e.g., as soon as each individual response is ready, such as within some return timeframe. Thus in the example of FIG. 6, the response 656(2) is returned separately from the batch response 658 that contains (at least) the response 656(1) and 656(p), e.g., returned at a later time. For example, the response 656(2) may be obtained from a cache at the data service, in which event the response 656(2) may be quickly returned, whereas other responses may need to be built from the backing data sources and thus take longer to obtain and compose into provider data blobs before returning.

In one or more implementations, a response is returned for each request, and the responses may come back in any order. Expanded results also may be returned as described herein, e.g., via the expansion rules 544 of FIG. 5.

The results thus may be streamed, each with a status code; for a batch response, the status code indicates that an individual status code is found in the body of each response portion. Even though a response may reference one or more other provider IDs in its reference set, those other providers need not be returned in the same response. Indeed, responses are not nested (e.g., as they correspond to graph data, and are not like tree data) but rather remain independent of one another, and thus the client can independently parse each response, cache each response's data, and so on.

As can be readily appreciated, processing batched requests as individual requests having individual responses allows the data service 110 and thus the batch request manager 652 to return a provider to a requestor without waiting for another provider. Such streamed responses may be particularly beneficial when multiplexing. For example, if one client requestor is requesting provider X while another requestor is requesting providers X and Y in a batch request, the de-multiplexed response to the multiplexed request for provider X to the one client requestor need not be delayed awaiting the response for provider Y to be returned (e.g., because the data for provider Y is taking longer to obtain).

Although the requests to the data service are batched (possibly multiplexed) and may have individually or combined streamed responses, as set forth above the initial requests 650 to the batch manager 652 may include a batch request seeking a batch response. Such a batch request made by a requestor may receive a batch response from the batch request manager 652 only when each of its batched requests has a response returned. For example, a menu object that requests a number of items in a batch request may want the items returned as a batch, e.g., in the requested order, rather than have to reassemble responses to the items returned individually. In this way, for example, a menu object may request a batch of tiles and receive the tiles as a batch. The batch request manager 652 is able to assemble the data of separate providers into a batch response as described herein.

Figure 7:
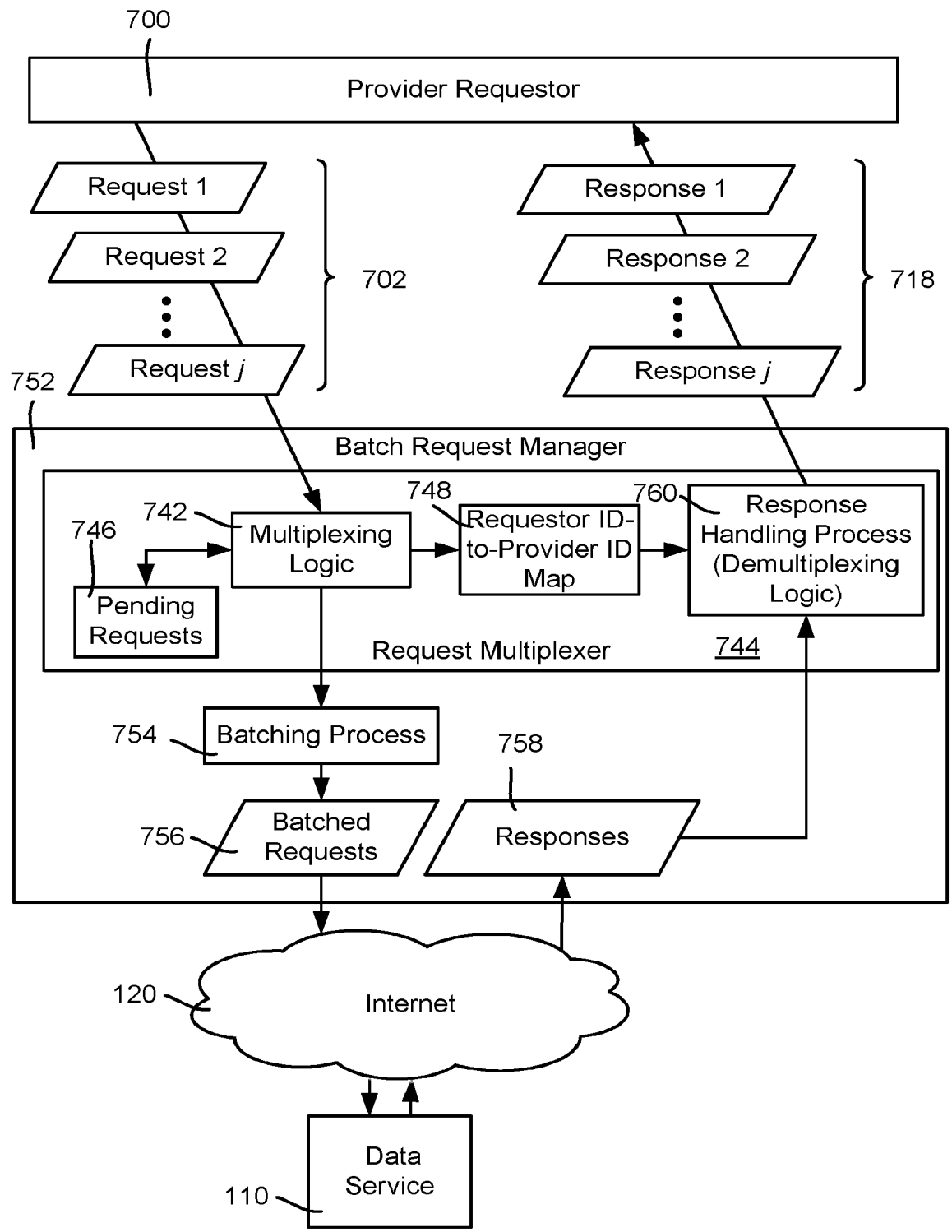
FIG. 7 is an example block diagram representation of a batch request manager of a client software platform configured to multiplex and batch requests for sending to a service, according to one or more example implementations.

FIG. 7 shows additional details of an example batch request manager 752 at the client software platform. In general, a provider requestor 700 such as part of the user interface navigation and rendering components make requests 702 (request 1-request j). Although not shown in FIG. 7, as described above the request manager 752 or another component (e.g., the requestor) may first check the client cache to see if the data is present and valid therein, and if so, use the data from the cache.

Those requests that are not satisfied with data from the client cache are further processed by the batch request manager 752. Each request is associated with some requestor identifier (e.g., the requestor object ID) and requested data item identifier (e.g., the provider ID for which data is sought), whereby responses 718 (response 1-response j) are returned for each request 702 (request 1-request j) to the corresponding requestor. If needed in a given implementation, the requestor ID may include a secondary identifier such as a counter value in the event that the same requestor makes multiple requests for data; e.g., requestor E makes a batch request 1 (E.1) and also makes another request 2 (E.2) while batch request 1 has not yet received a response. Such a scheme allows mapping the returned data back to the requestor as well as differentiating responses back to the same requestor.

The request manager 752 is provided for in part for efficiency, namely to handle such requests and responses in a way that reduces the load upon the data service 710. As described herein, in one or more implementations, such efficiency is obtained by batching requests and multiplexing requests, (although batching and multiplexing may operate alone, without the other being used in a given implementation).

Batching generally is directed towards including multiple requests into a single batch request instead of making individual requests, which is generally more efficient. To this end, batching collects requests for some amount time, e.g., corresponding to a rendering frame, and then sends a batch request when the time is reached. The number of requests in a batch may be limited, e.g., to sixteen or thirty-two, and thus to handle a larger number of requests, multiple batch requests may be sent per time window, e.g., generally at the same time, but alternatively a batch may be sent as soon as that batch is full.

Multiplexing generally refers to making a request for the same data only once, basically filtering out duplicate data requests from different requestors. As described herein, multiplexing may be done by tracking pending requests, (e.g., by data item identifier such as the requested provider ID) and only making a request for the data when another request for the same data is not already pending. A pending request may be considered one that has been previously made but has not yet received a response, as well as one that has been already added to a batch "buffer" waiting to be sent (if batching is being performed). As can be readily appreciated, because a multiplexed request results in a single response that has to be sent back to multiple, different requestors, some tracking needs to be done so that a multiplexed request may be mapped back to each of its initiating requestors.

By way of example, consider that among the many requests handled by a given request handling server, five different requestors have made requests corresponding to providers that either are in a dehydrated state, cache miss or expired cache data condition, which causes a need to have the data service 710 invoked. Thus, the batch request manager 752 multiplexes and/or batches these five requests. As part of multiplexing, the batch request manager 752 needs to have a mapping mechanism that maintains a relationship between which request corresponds to which requestor.

As a more particular example, consider that both requestor 1 and requestor 2 have requested data for some data provider Q. The multiplexer logic detects this, and only makes a single request to the data service for the Q data. However, when the single response comes back with the Q data that satisfies the single request for Q, the request manager's mapping mechanism (which may be considered a "de-multiplexer") recognizes that this data applies to two different requestor requests, and thus that requestor 1 needs its own response with data Q, as does requestor 2. Two responses are thus returned to the two requestors, one for each request.

Thus, in FIG. 7, multiplexing logic 742 receives the requests 702, (which may include batch requests and/or single item requests), and for each request, maps a requestor identifier (ID) to the provider identifier in a suitable data structure exemplified as a requestor ID-to-provider ID map 748. For each request the multiplexing logic 742 also checks a set of pending provider IDs 746, to determine whether a request for that provider is already pending. If so, the request is not made again, otherwise the request is forwarded to a batching process 754.

The batching process 754 collects such requests, and sends a set of one or more batched requests 756 to the data service 110, e.g., over a suitable connection of the internet 120. The data service 110 returns a response for each request, shown as responses 758. A response may contain response data that satisfies its corresponding request, but may contain an error code or the like when the request cannot be satisfied with data.

As set forth above, requestors may send batch requests among their requests 702, which may be returned as batch responses in the responses 718 to the requestors, that is, when all batched requests have received a response. However, as described herein, the responses 758 to multiplexed batched requests 756 need not be returned as a corresponding batch, but may be separately streamed when ready (although if ready together, such streamed responses may include partially batched or fully batched response data). In this way, the responses 758 to multiplexed and batched requests 756 may be returned without waiting for a full set of responses to such a batch request, as doing so may delay other responses. For example, if requestor 1 requests A, B and C in a batch request, and that request is made in multiplexed, batch request to the data service 110, and requestor 2 requests A and B (not sent to the data service, because A and B are already pending), then there is no reason for requestor 2 to have to wait for request C to complete (although it was multiplexed and batched with A, B and C), as C may take a relatively long time to complete.

As described herein, a response may correspond to multiple requestors, and thus a response handling process 760 (de-multiplexing logic) uses the requestor ID-to-provider ID map 748 to return a response for each request. Note that a response may be in the form of an error message, or may include an error message possibly along with requested data; (e.g., a response to a requestor batch request for A, B and C may return data for A, data for B and an error for C).

Figure 8:
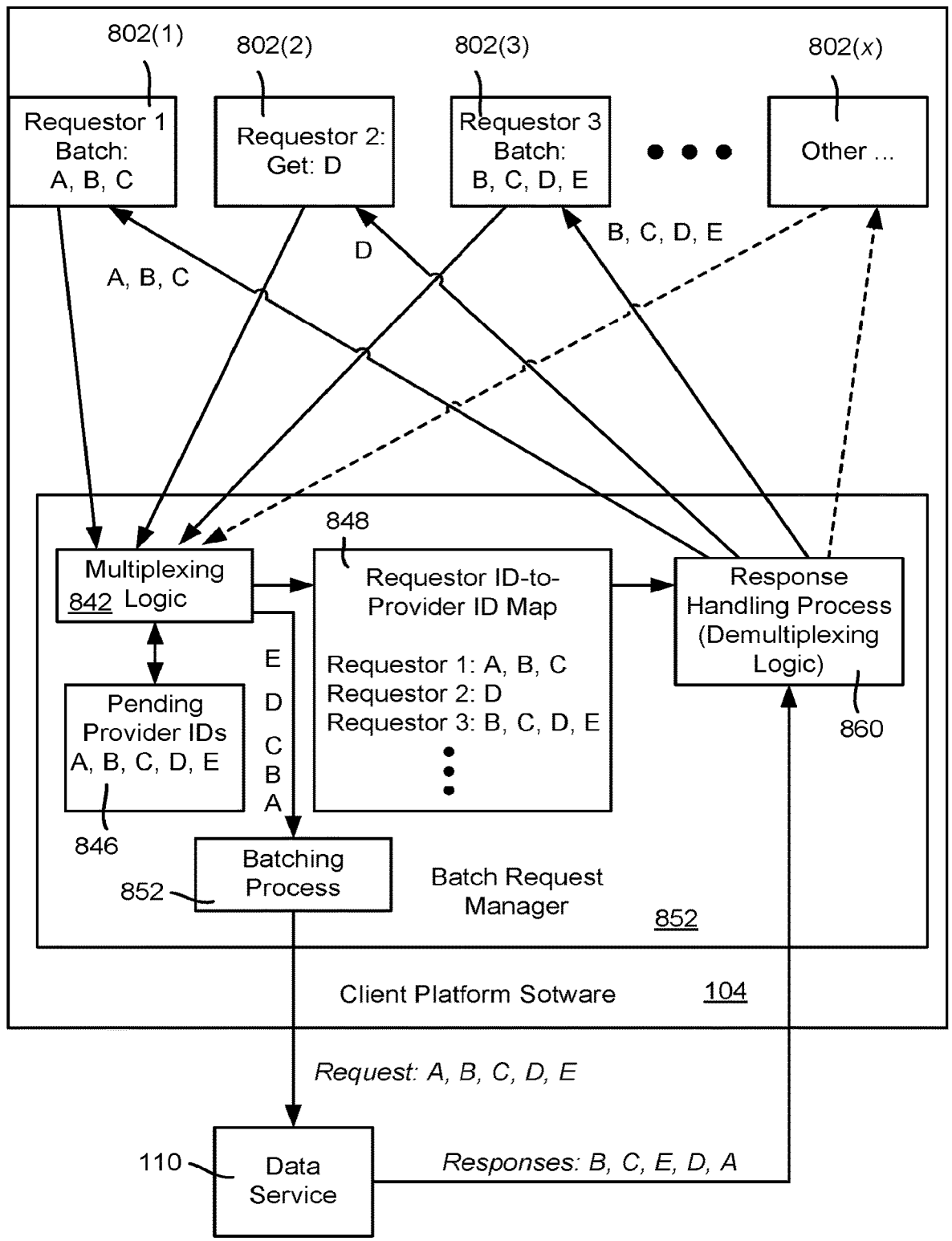
FIG. 8 is an example block and representation of a client batch request manager showing how data requests may be multiplexed, batched and sent, with responses returned and de-multiplexed for returning, according to one or more example implementations.

FIG. 8 shows an example of a batch request manager 852 of the client software platform 104, with requests (A)-(E) made by various requestors 802(1)-802(x). In FIG. 8, requestor 802(1) makes a batch request corresponding to data request (provider) IDs (A), (B) and (C), requestor 802(2) makes a get request corresponding to data provider ID D, and requestor 802(3) makes a batch request corresponding to data provider IDs (B), (C), (D) and (E). There may be other requests as well, as represented by block 802(x), however for purposes of this example consider that only requestors 802(1)-802(3) are making requests within this batching timeframe.

The requests 802(1), 802(2) and 802(3) are processed by the multiplexing logic 842 of the batch request manager 828. As the requests 802(1), 802(2) and 802(3) are received, the multiplexing logic 842 updates the requestor ID-to-provider ID map 848. Further, duplicate requests are handled by checking the pending request ID list 846 so as to only add one instance of each request ID to the pending request ID list 846 and thereby send only one single corresponding request to the batching process 852.

At an appropriate time, e.g., once per rendering frame, the batching process 852 sends a batch request for items (A), (B), (C), (D) and (E) to the data service 110. The data service 110 returns data (e.g., from one of its front-end caches when cached, or attempts to obtain the data from the back-end service/one or more data stores if not cached at the front end). To reiterate, the responses from the data service 110 need not be batched in this example, and may be returned in any order, e.g., responses for data items (B), (C), (E), (D) and (A) are returned in the example of FIG. 8.

Any of these requests may result in an error response rather than the actual data. Moreover, in one or more implementations, expired data (If available) may be returned in response to a request instead of a failure message, possibly with some indication (e.g., the expiration time itself) that the data is expired.

As described herein, these responses, which were multiplexed, need to be mapped back to their requesting requestors. This is performed by the response handling process 860, using the map 848 to build a response for each requestor. If the requestor made a batch request, in one or more implementations the response to that requestor may be batched. Alternatively, a response to a requestor's batch request may not be batched, but returned as received, basically in a "stream" of responses back to the requestor.

Figure 9:
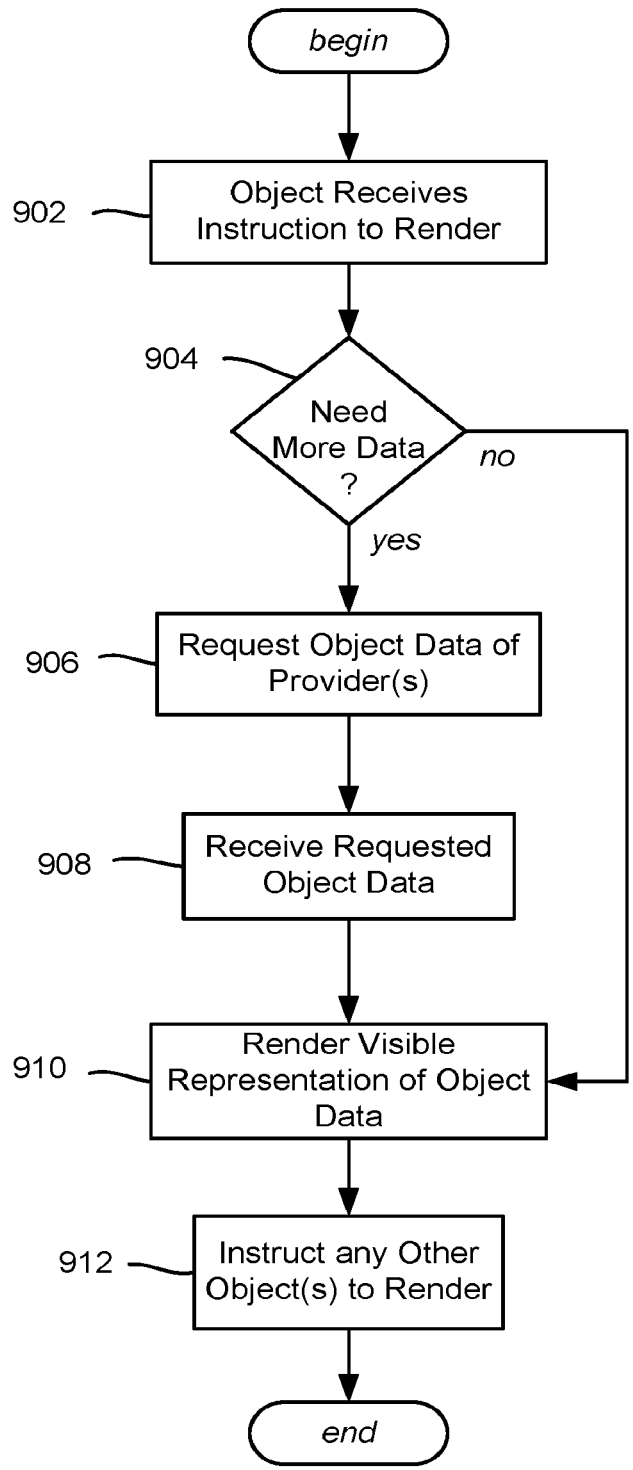
FIG. 9 is a flow diagram showing example logic/steps that may be taken by a client requestor (e.g., user interface object) to request, receive and use provider data, according to one or more example implementations.

FIG. 9 is a flow diagram showing example steps that may be taken by a user interface object to render a visible representation of itself, including requesting any needed provider object data. Step 902 represents the object receiving an instruction to render itself. For example, a menu may be selected via a button, and that menu gets instructed to render itself. Note that in one or more implementations, the root menu is hosted, and receives such an instruction from its host.

Step 904 represents the object determining whether it needs more data to render. For example, the object may be a child object that the parent has already requested. Also, for any other reason an object have been recently rendered or virtualized (instantiated in anticipation of a need for rendering), whereby the object may still be instantiated in memory. If no data is needed, step 904 branches to step 910 to render a visible representation of its object data.

If data is needed, step 906 requests the data, and step 908 receives the data. Note that in an asynchronous programming environment, the request may first receive a promise, with the data becoming accessible when the promise is fulfilled. The promise may be fulfilled via cached data, or via a request to the back-end that needs to be obtained from the data sources, and thus there is some delay between step 906 and step 908, with the length of the delay generally related to where the requested data resides. Once the needed data is returned, as described above step 910 renders a visible representation of the object's data.

Step 912 represents instructing any other object or objects to render, which are basically child objects that each perform steps similar or identical to those of FIG. 9. For example, a menu may render itself as a rectangle having various visible properties such as size, color and so forth, possibly along with a logo (image) and a background image, and then instruct its child buttons to render. In this recursive way, child objects can generally obtain data (that builds the graph) as needed and render representations of themselves atop their parent objects, and so on until each child object that has no children is rendered.

Notwithstanding, a parent object can request data for child objects (e.g., at steps 904 and 906) before requesting that the child objects render themselves. For example, a menu can make a batch request for a number of its child objects at once (e.g., to appear as the menu's buttons or tiles when rendered), and then after rendering the menu representation of itself, request the child objects to render. Note that, a menu object may only request a subset of its children, e.g., only those that are currently scrolled into view; as a more particular example, to save resources a "Movies A-Z"

menu may only want a dozen or so of its hundreds or thousands of children (each representing a movie) to be instantiated at any one time. Note however that a menu object may request more than its currently visible children, e.g., to virtualize additional children in advance, in anticipation of their being scrolled into view, which typically provides a better scrolling experience to the client user.

Figure 10:
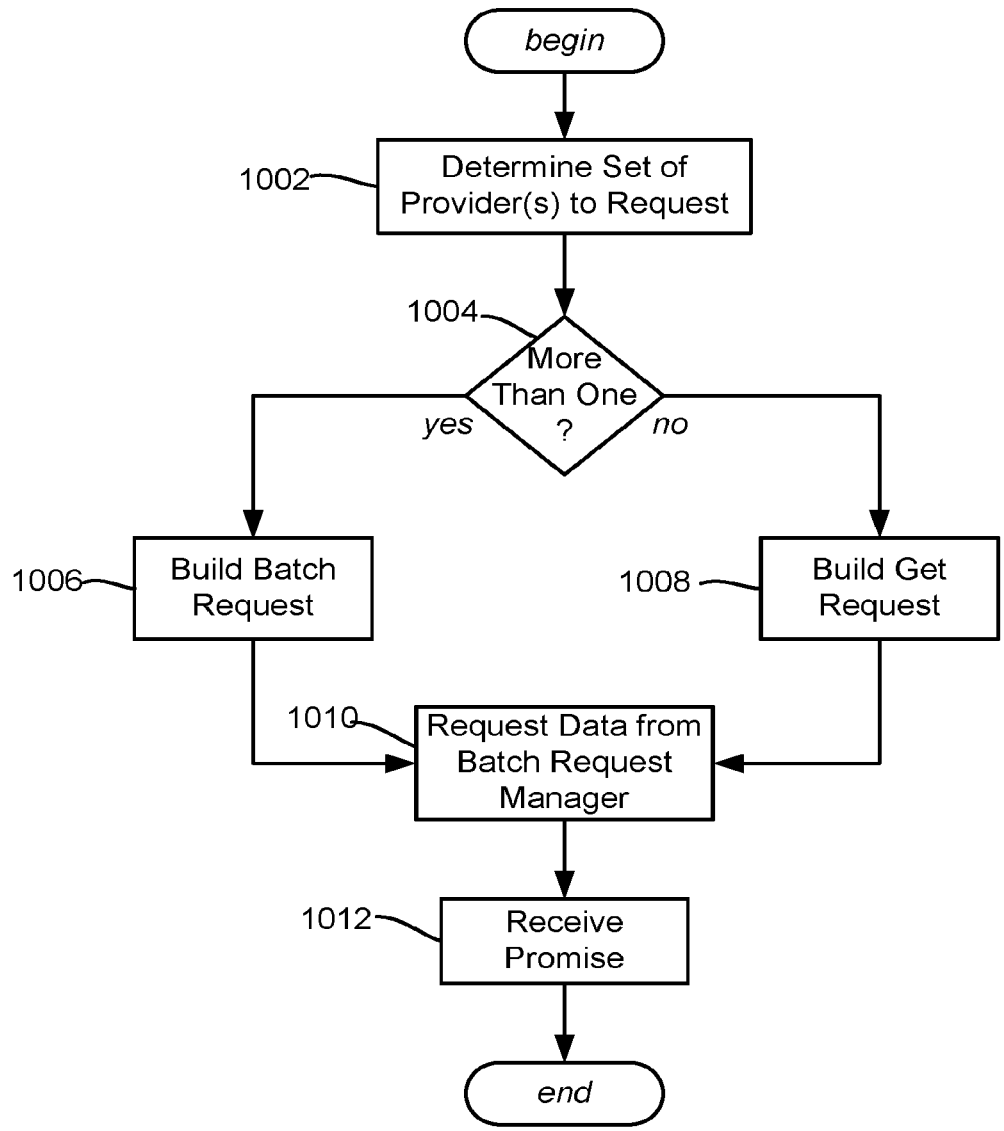
FIG. 10 is a flow diagram showing example logic/steps that may be taken by a client requestor to submit requests for provider data, according to one or more example implementations.

FIG. 10 is a flow diagram showing example steps that may be taken by a client platform component requestor to obtain provider data. For example, the component that requests the data may be a UI object that needs provider data to render a visible representation of (at least part of) itself, such as a menu that is requesting tiles, possibly including virtualized tiles (their data is desired in advance for likely future rendering, e.g., if the user scrolls new tiles in the menu's visible area). The logic of FIG. 10 (generally corresponding to step 906 of FIG. 9) may be triggered whenever provider data is needed, e.g., at program startup, when user interaction changes the displayed objects, when another event occurs (e.g., a timer reaches a time limit or certain time of day), and so on. Note that as described herein, other components (including providers) may be independently making similar requests at generally the same time, including possibly for the same provider.

The provider graph built by each client is a subset of the full set of provider data maintained by the data service, e.g., that forms a "virtual" graph. Note that client-specific providers such as a user provider or a watch-list provider are not available to other clients, and it is feasible to limit the providers to which a client has access based upon parental controls and the like. In general, the client only requests the providers that are needed to render user interface representations of the provider data, plus possibly some additional providers for object virtualization. Note that the data service also may expand the request to return more providers than actually requested. The client may cache providers' data, and thus the client provider graph maintained at the client may be larger than the rendered portion thereof.

Step 1002 represents a requestor determining the set of providers to request, e.g., for requesting in a get request or a batch request. For example, a client may need to render a "Genre" menu, and thus step 1002 determines from the set of references in the Genre provider data what other providers (e.g., comprising tiles, buttons and so) on need to be obtained to properly represent the "Genre" menu. Data from the Genre menu provider is thus requested as needed.

Each other referenced object may request its own data from a provider. For example, a tile object (e.g., representing a movie) referenced by the Genre menu object seeks at least a title from the provider node that contains the movie data for that tile object; (a tile may request additional information from the provider node, such as a rating, image URL and so forth). As set forth above, note that for some menus, not all of the providers contained in the reference set may be requested at once. In the above example, a menu object such as "Movies A-Z" (in which the Movies A-Z menu provider may reference hundreds or even thousands of movie tiles in its reference set) may request; only a subset of these (e.g., those currently scrolled into view plus possibly a few virtualized ones), as too many resources would be consumed by requesting all of the tiles' data.

Step 1004 branches to step 1006 to build a batch request if more than one provider request is being made by a requestor, e.g., ten feature providers for a menu provider. Otherwise step 1008 builds a get request for a single provider. Step 1010 sends the batch or get request. Step 1012 represents receiving a promise for the data in an example asynchronous programming environment.

Figure 11:
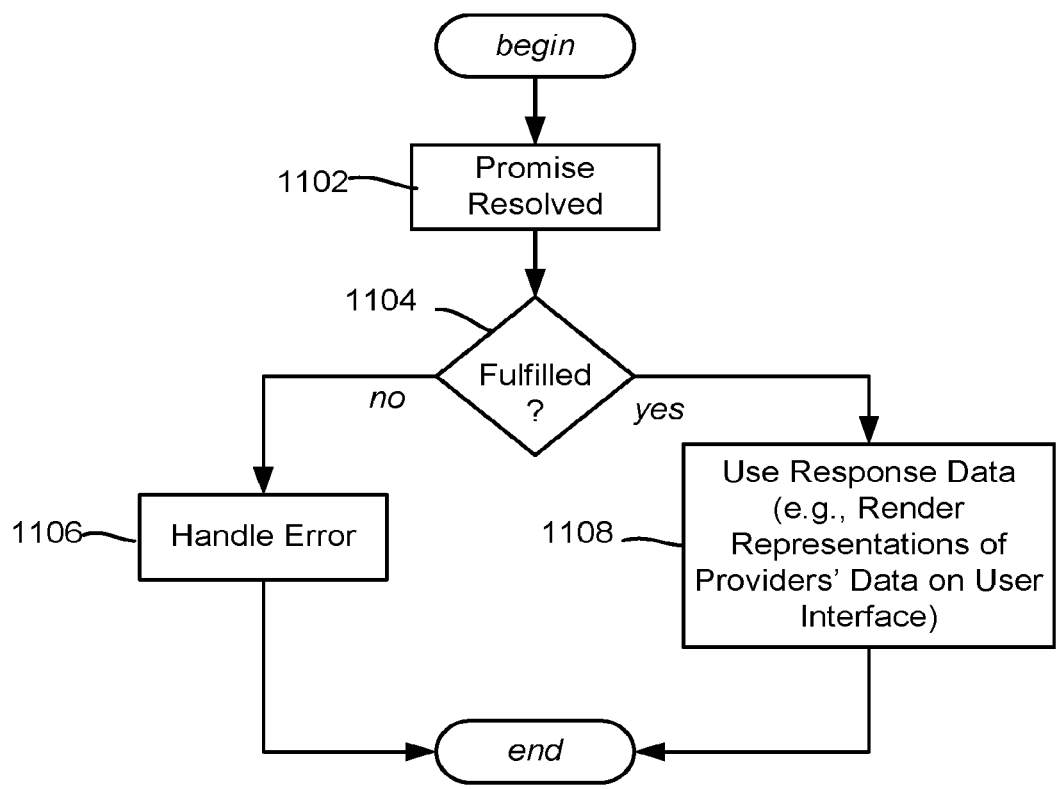
FIG. 11 is a flow diagram showing example logic/steps that may be taken to handle a response to a client request for provider data, according to one or more example implementations.

The example steps of FIG. 11 may be invoked when a promise is resolved (at step 1102, generally corresponding to step 908 of FIG. 9). Step 1104 evaluates whether the promise was fulfilled or rejected; (if rejected, step 1106 deals with the error via an appropriate handler; such errors are not further described herein). When a promise is fulfilled, step 1108 represents using the data in some way, e.g., to render a visible representation of the provider(s) or part of the provider(s), (which generally corresponds to step 910 of FIG. 9). For example, if a feature provider for a requested tile is returned, the title may be retrieved from the provider's object data and rendered as text; further, once a provider's data is obtained its reference set is known, whereby a further request for one or more providers referenced by that now-obtained provider may be made, and so on. Note that a promise for a request may be fulfilled with a response that contains an error message rather than the provider data. In such an event, the error message may be used to inform the client user of the problem.

Figure 12:
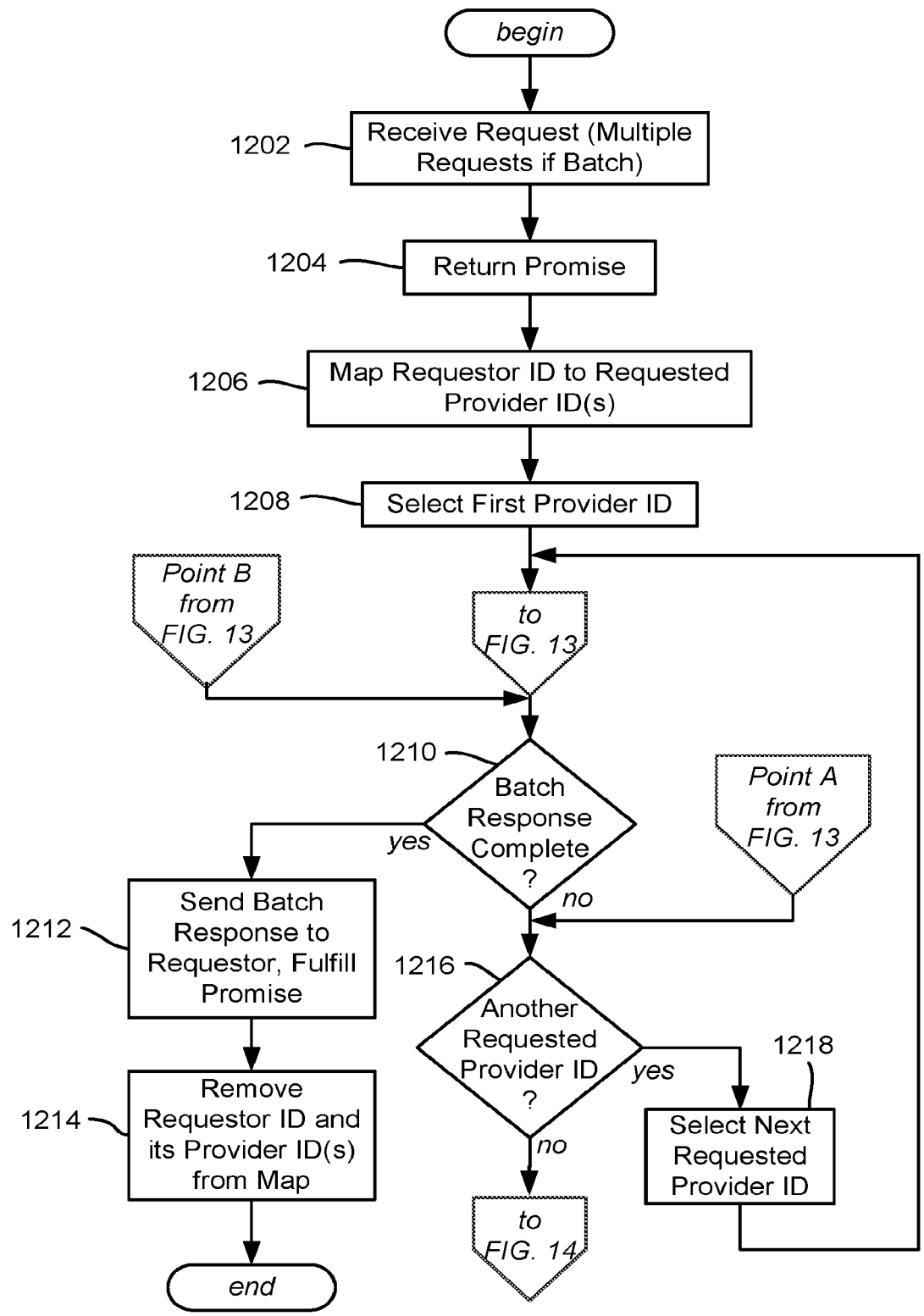
FIGS. 12-14 comprise a flow diagram showing example logic/steps that may be taken to handle requests for data at a client component, including to multiplex and batch data requests to a data service, according to one or more example implementations.
Figure 13:
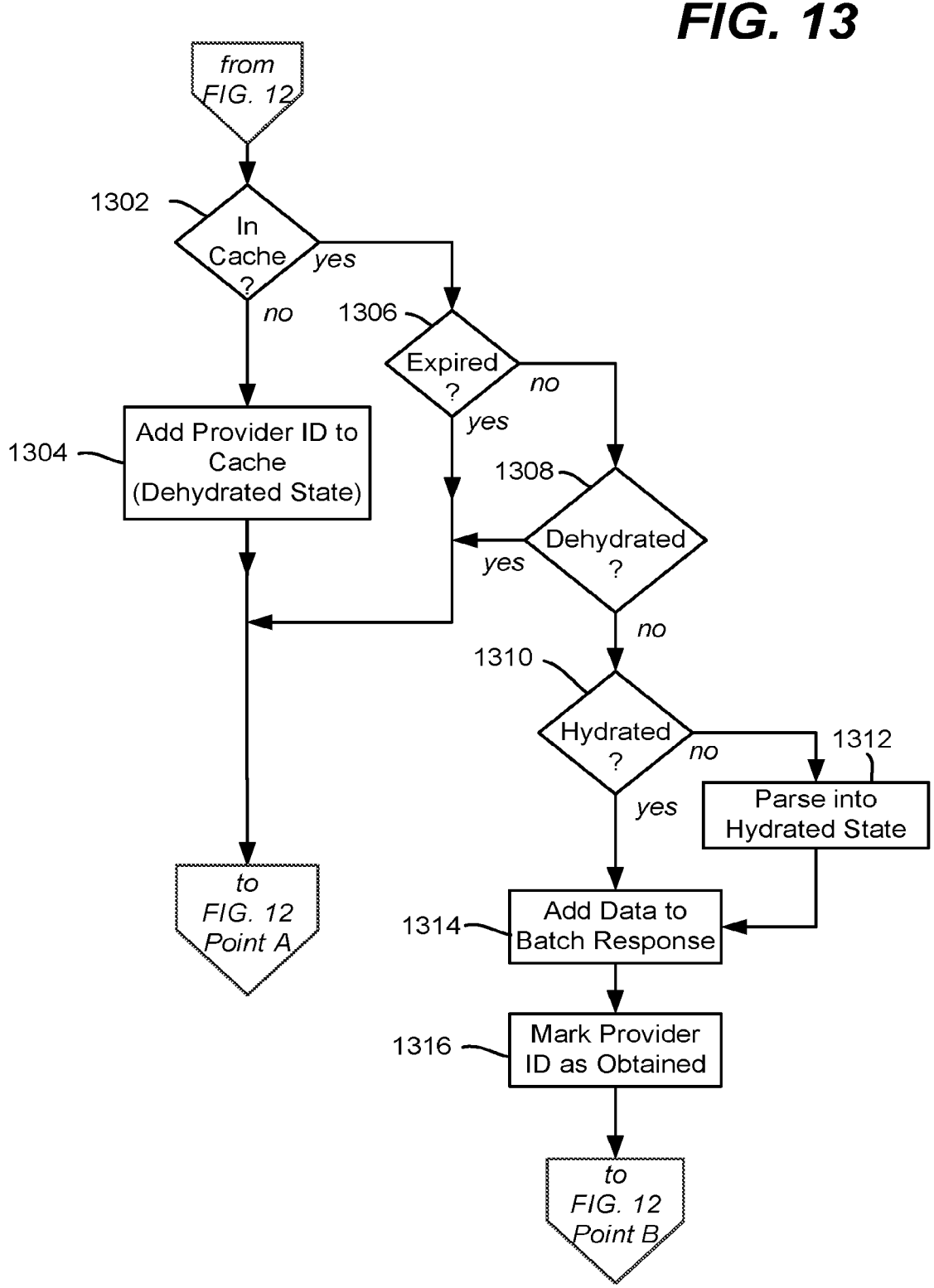
Figure 14:
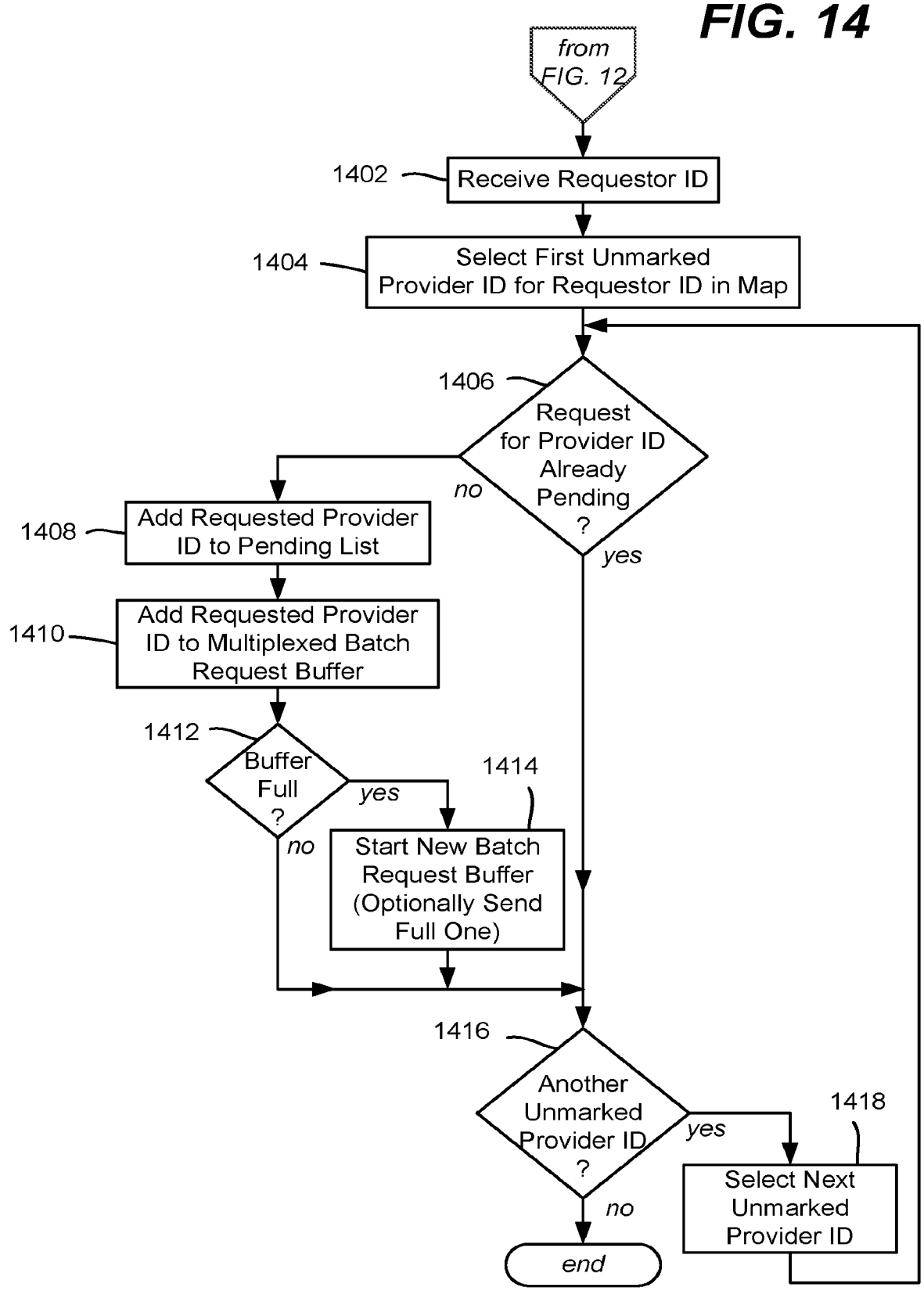

FIGS. 12-14 comprise a flow diagram showing example steps/logic that may be taken by a batch request manager when a request for data is received (step 1202). In this example, at step 1204 the batch request manager returns a promise for the data as appropriate for an asynchronous programming environment; (in other environments other techniques may be used with respect to retrieving the data, such as callbacks, synchronous parallel blocking threads and so on).

In one or more example implementations, the example batch request manager described in FIGS. 12-14 handles requests for provider data by first accessing the client cache to look for the provider and its requested data; (note that in alternative implementations, the requestor or another component may access the client cache and only invoke a batch request manager if fresh data is not available from the cache). The example batch request manager described in FIGS. 12-14 also handles either a client single "get" request or a client batch request in the same way, e.g., by considering a single request as if it was a "batch" request having a single provider ID; (although in alternative implementations, single requests may be handled separately from batch requests, by generally similar logic). Thus, as used herein, except where otherwise noted a "batch" request from a requestor may be one that contains a single provider ID get data request, (even though such a single request may not technically be considered a proper batch request in other contexts). Thus, step 1202 represents receiving a requestor's request, which may be a single "Get" request (or the like) with a data ID, or a batch request containing multiple data ID requests. Step 1204 represents returning a promise for the request.

Step 1206 represents maintaining the requestor-to-provider ID(s) relationship, e.g., in the map 648 (FIG. 6). With this information, a response is able to be returned to each separate request for data, including when requests for the same data are multiplexed into a single data service request for that data and later de-multiplexed. If the same requestor makes multiple, separate requests, the map may contain a separate entry for each request so that the requestor gets back a response for each request.

Step 1208 selects the first provider ID (which may be the only one) for the batch request from this client. The exemplified batch request manager process then continues to step 1202 of FIG. 12 to look for the requested provider data for this provider ID in the client cache.

If not in the cache at step 1202, step 1204 adds the provider ID to the cache whereby the provider is cached in the dehydrated state, (that is, with no provider data). The process then returns to FIG. 12, point A, which corresponds to step 1216. If cached at step 1202, step 1206 is performed to evaluate whether the provider data in the cache is expired. If expired, the process returns to FIG. 12, step 1216. If cached as evaluated at step 1202 and not expired as evaluated at step 1206 step 1208 is performed to determine whether the provider data is in the dehydrated state. If dehydrated, the process returns to FIG. 12, step 1216.

If not in the dehydrated state at step 1208, step 1210 is evaluated to determine whether the data is in the hydrated state (as opposed to the partially hydrated state). If hydrated, step 1210 branches to step 1214; if partially hydrated, step 1212 represents parsing the data into the hydrated state; at this point, the data is cached, unexpired and hydrated.

When cached, unexpired and hydrated data is available, step 1214 adds the data to the batch response. Step 1216 marks the provider ID in the map as having its data obtained for this requestor ID. The process then returns to FIG. 12, point B, which corresponds to step 1210 of FIG. 12.

Step 1210 evaluates whether the batch response is now complete based on the provider data having been found in the cache. If so, step 1212 sends the batch response to the requestor to fulfill the promise, and step 1214 removes the requestor ID and its associated provider ID(s) from the map.

If the batch response still needs more provider data, or valid data was not found in the cache, step 1216 is performed along with step 1218 until each provider ID in the batch request has been looked for the cache. Note that if the entire batch request can be satisfied with data from the cache, the steps of FIG. 14 are not performed for this request. Further, note that if a given cache may be scanned for multiple entries with a single batch request, then steps 1208, 1216 and 1218 that separately select and process each provider ID against the cache are not needed for such a cache.

If the data of at least one provider ID for this request has not been returned from the cache, the steps of FIG. 14 are performed to batch and/or multiplex each outstanding provider data request to the data service. Note that multiplexing is described herein, however in alternative implementations multiplexing is optional; e.g., if the client software rarely has multiple requests for the same data in the same batching timeframe, then the client platform may be configured such that multiple requests for the same data are preferable to the overhead of multiplexing. The example steps of FIG. 14 include multiplexing concepts.

Step 1402 represents receiving the requestor ID at the multiplexing logic of the batch request manager. Step 1404 looks for the first unmarked provider ID associated with the requestor ID received at step 1402, (where "marked" indicates the provider data was in the cache, and "unmarked" refers to the need to obtain the data for the provider ID from the data service).

Step 1406 is related to multiplexing, and checks whether a request for this provider ID is already pending (e.g., from another request), by checking the set of pending requests 746 (FIG. 7). If not already pending, step 1408 adds the request for the provider to the pending list, and step 1410 sends the request to the batching process where it is added to the (multiplexed) batch request buffer; this corresponds to blocks 754 and 756 of FIG. 7. If the batch request buffer becomes full as checked at step 1412, a new batch request buffer is started at step 1414. A full buffer may be sent as a batch request to the data service along with any other buffer or buffers at the appropriate time, e.g., once per rendering frame. An alternative option is to instead send a full buffer as soon as full, followed by as any other batch buffer at the sending time.

Step 1416 checks whether there is another provider ID to be handled from this batch request from the requestor. If so, step 1218 selects the next requested provider ID in the batch and returns to step 1406 to repeat the multiplexing (and batch adding) process until the (unmarked) batched set of received requests from the requestor have been handled.

Figure 15A:
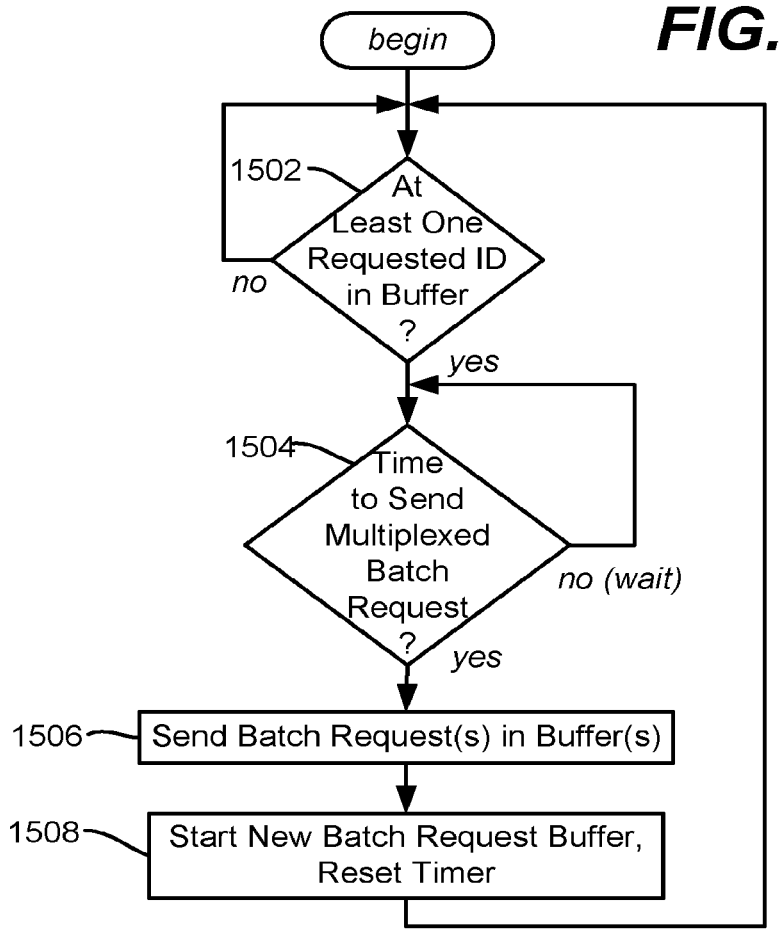
FIGS. 15A and 15B are flow diagrams showing alternatives of example logic/steps that may be taken to send batched data requests, according to one or more example implementations.
Figure 15B:
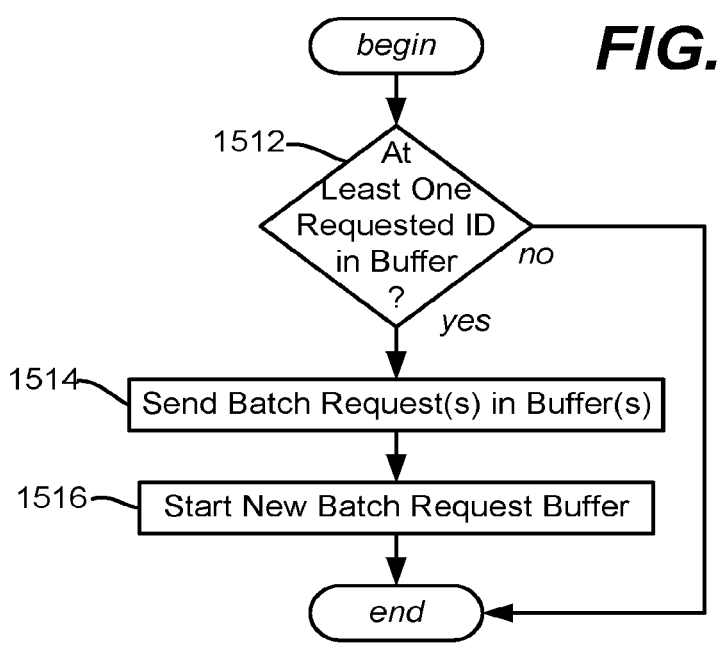

FIGS. 15A and 15B are flow diagrams showing example steps that may be taken to send the batch buffer in a batch request to the data service. Step 1502 checks whether there is at least one request in the buffer; if not, the process waits for one. Note that an alternative is to not invoke the logic of FIG. 15A unless the buffer has at least one request therein. Step 1504 represents delaying until it is time to send the batch request; it is understood that this is typically not a blocking operation, and that more requests may be being separately added to a buffer while waiting.

When time to send, step 1506 sends a batch request corresponding to each batch buffer; note that multiple buffers may need to be sent (unless a buffer is sent when it is filled, e.g., via the option at step 1414 of FIG. 14). Step 1508 starts a new batch request buffer, and step 1508 resets the timer for the next send time.

FIG. 15B is generally similar to FIG. 15A except that FIG. 15B is called/triggered when it is time to send a batch request buffer, and thus the timer/time evaluation is not needed in the steps of FIG. 15B. As can be appreciated, either the logic of FIG. 15A or FIG. 15B, as well as other alternatives, may be used in a given system.

If in FIG. 15B at least one request is in a buffer at step 1512, step 1514 sends the buffer, or multiple buffers if more than one needs to be sent. Step 1516 starts a new batch request buffer. Note that an alternative is to not trigger the logic of FIG. 15B unless the buffer has at least one request therein at the triggering time.

Once a buffer of one or more batched requests is sent, responses begin arriving to each request. In one implementation, as described herein, these responses need not be returned in a batch form (e.g., by the data service) but rather streamed to the batch request manager when each one or group of responses is ready, whereby each response may be de-multiplexed. Note that some responses may be from a data cache of the data service, while others may be obtained by calls to a physical data backing store or stores, whereby the response times may be quite different. Further note that even though the responses are basically considered separately streamed responses at the batch request manager, the batch request manager may combine the de-multiplexed responses into a batch response to match any batch request from any requestor.

Figure 16:
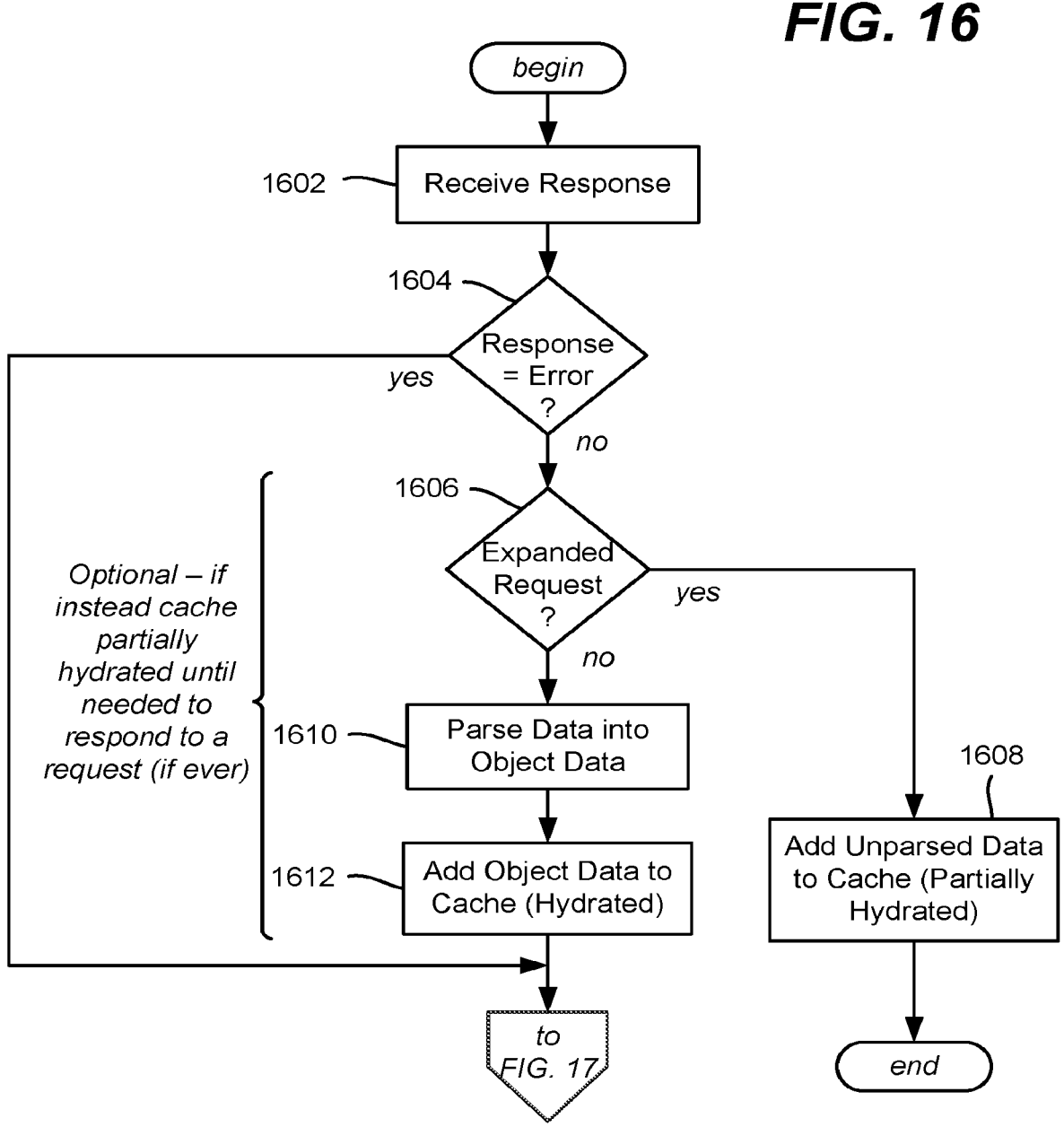
FIGS. 16-18 comprise a flow diagram showing example logic/steps that may be performed to handle a response received at a client component with respect to a request sent in a multiplexed, batched request set, according to one or more example implementations.
Figure 17:
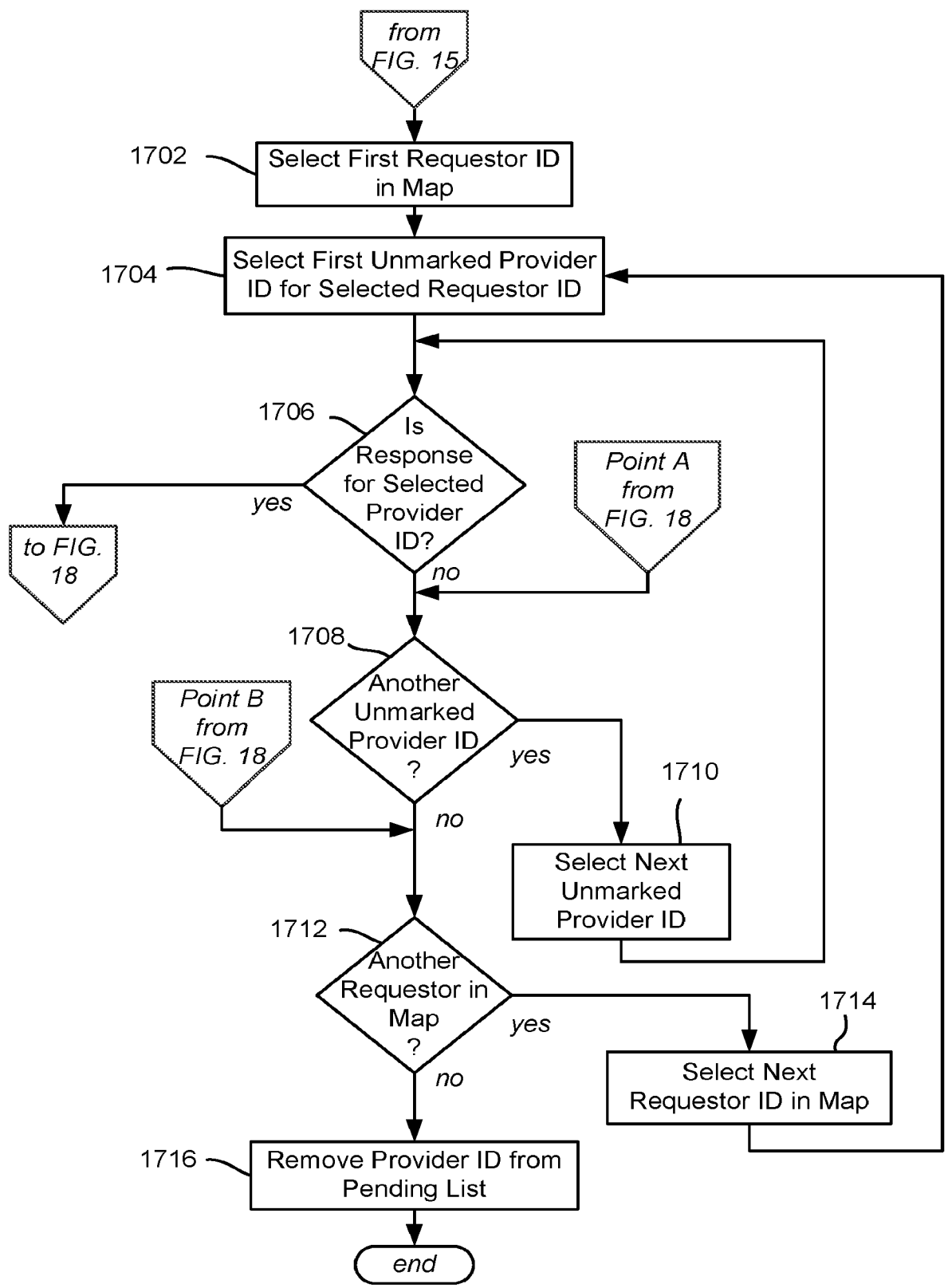

FIGS. 16 and 17 comprise a flow diagram showing example steps that may be taken when a response to a batched, multiplexed request is received, e.g., from the data service, as represented by step 1602 of FIG. 16. Note that with respect to when a requestor receives a response, FIGS. 16 and 17 are based on an implementation in which a batch response is returned to the requestor only when each of that requestor's requested batch requests have received a response (which may include a timeout or other error response). Thus, a batch response is built from each of the separate responses for the corresponding requests before being returned as a single batch response to a requestor. Note that it is alternatively feasible to return individual responses to a requestor's batch request instead of waiting for each response; similarly batch response subsets (that may include more than one response but not all responses) may be returned instead of waiting for a complete batch response to be assembled before returning.

Step 1604 of FIG. 16 evaluates whether the response was an error message. If so the response is still handled as described herein with respect to FIG. 17, but there is no provider data to cache.

If there is valid data (not an error), step 1606 evaluates whether the response was to an expanded request made by the data service as opposed to a requestor-initiated request (e.g., as flagged in the response). If an expanded request, the data is cached in its (unparsed) partially hydrated state at step 1608, and the response handling process ends for this response. Note that steps 1604 and 1606 assume that a data service-initiated expanded request does not have an error message returned to a client. If a response to a requestor-initiated request, then step 1610 parses of the data into the hydrated object model data that the client platform can use. Step 1612 adds the object data to the client cache.

One alternative to FIG. 16, steps 1606, 1610 and 1612 is to always cache newly received provider data in its partially hydrated state. Then, when processing the response against outstanding request(s) for this provider's data, parse the data into the hydrated state if needed by any requestor. One advantage to this option is not having to flag or otherwise differentiate expanded requests/responses at the data service from those that were actually requested; however a disadvantage is that an expanded request/response (that appears otherwise the same as an actual request/response) that was not actually requested by any requestor needs to be evaluated against outstanding requestor requests to see if it was actually requested by any requestor (but in fact was not).

For hydrated data (and error responses), the steps of FIG. 17 are performed to de-multiplex the response for returning to each associated requestor. FIG. 17 also builds up a batch response to each requestor's batch request (as needed) until completed, at which time the completed batch response is returned. A request for a single provider is handled in the same way, e.g., as if there was a batch request that contained only a single provider ID.

In general, the steps of FIG. 17 walk through the requestor ID-to-provider ID map attempting to match the provider ID in the currently received response back to each provider's batch request, that is, including to de-multiplex any responses to previously multiplexed requests. To this end, step 1702 selects the first requestor ID-to-requested provider ID(s) mapping in the map. Step 1704 selects the first "unmarked" provider ID for this requestor ID, that is, the first request ID that has not been marked as already having received a response for it.

Step 1706 evaluates whether the response is for the selected requestor ID. If so, the process continues to FIG. 18 as described below. If not, step 1708 looks for another unmarked provider ID (if any) in the batch request for this requestor ID, and if there is another such request ID, step 1710 selects this next provider ID to look for a match with the response.

Steps 1712 and 1714 advance the process for each other requestor ID in the requestor ID-to-provider ID(s) map. When no requestor ID having a provider ID remains to be compared, step 1716 removes the provider ID from the pending list. Note that for an expanded response, no provider ID may be in the pending list. Further note that step 1716 may occur at the end of processing the response so that in implementations in which new requestor batch requests can be added to the requestor ID-to-provider ID map, e.g., while the response is being processed against the earlier requestor batch requests, another request for the same data is not sent if it corresponds to this response.

Figure 18:
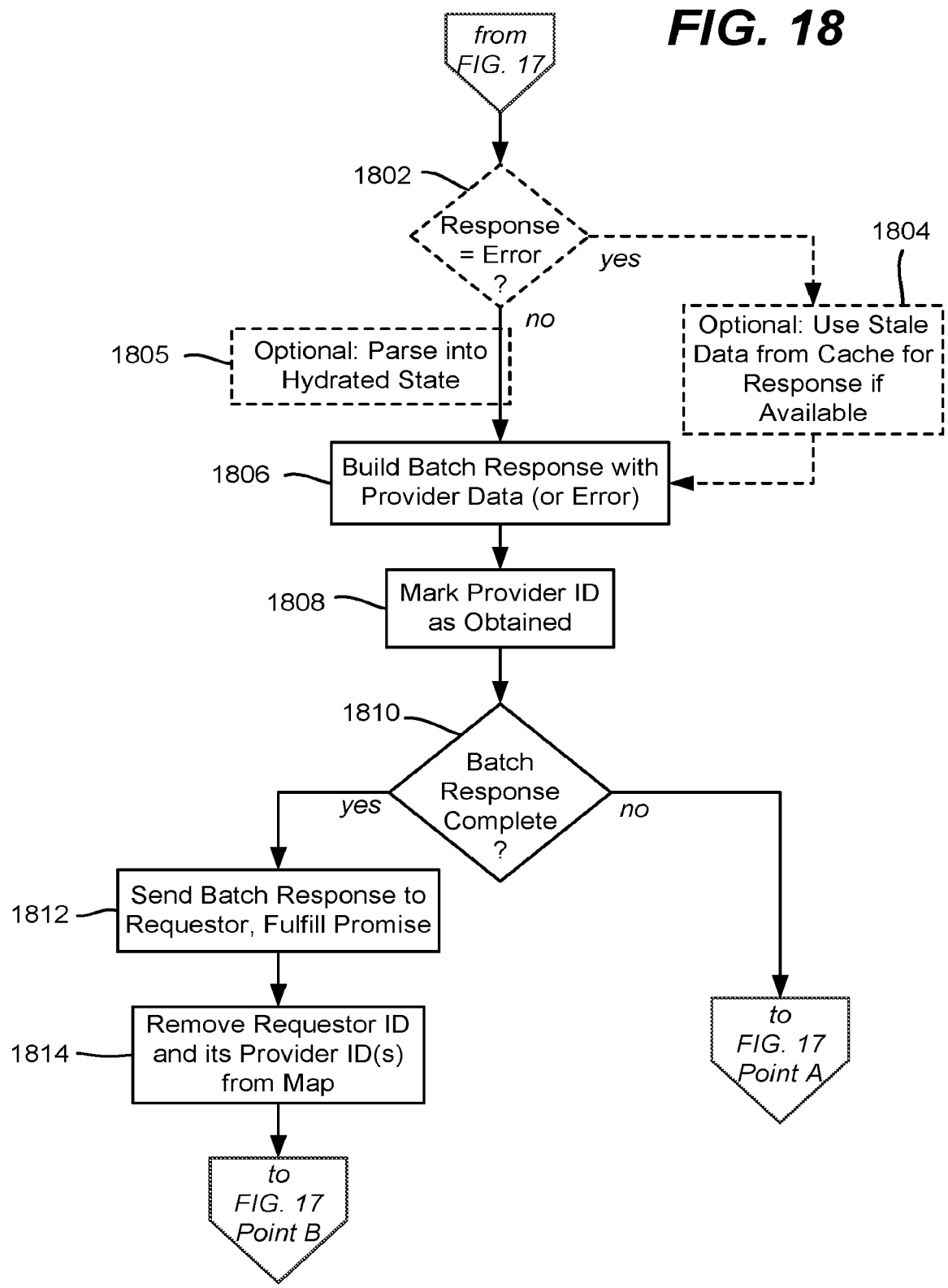

When the response matches the selected requestor ID and provider ID at step 1606, FIG. 18 is performed, generally to determine whether all requests in the batch request have received responses. If so, a batch response is returned to the requestor with a full set of batched responses to the batch request. Note that alternative implementations may send a response to a corresponding requestor as each response is received rather than batch the responses to match a requestor's batch request.

To process a response, step 1802 of FIG. 18 represents optionally determining whether the response was an error response. If so, the response will be returned as an error, although in one or more implementations it is an option to use stale data from the cache (step 1804) if such data is available rather than sending an error. Note that it is feasible to consider an entire batch response to be an error if any one provider request had an error returned for it; however it is also feasible to return a combination of valid provider data and error data in batch response; (the example of FIG. 18 uses this latter alternative).

If not an error, step 1806 begins or continues to build the batch response based upon the currently received response. In general, this may be performed at step 1808 by marking the requestor's provider ID as received/handled; a pointer to the response data, e.g., maintained in a suitable data structure (possibly the cache), may be used to reference this response's data. It should be noted that as described above with reference to FIG. 16, steps 1606, 1610 and 1612, an option is to cache newly received response data into the cache in the partially hydrated state, without parsing until needed; if this option is implemented, then a parsing/hydrating operation (step 1805) may be performed between step 1802 and 1806 (for partially hydrated, non-error responses) that need to be parsed into the object (hydrated state) form.

Step 1810 evaluates whether the batch response is complete based upon this current response having been received, that is, no provider ID remains unmarked for this requestor ID. If not, step 1810 returns to FIG. 16 at entry point A (corresponding to step 1608) to evaluate whether the response also matches another provider ID in the batch request. Note that a batch request ordinarily should not contain a request for the same data more than once, and if this can be guaranteed, then step 1810 can instead return to FIG. 16 at entry point B (corresponding to step 1612). Otherwise a batch request containing the same requested provider ID more than once (e.g., A, B, A, D) may result in a batch request that never has a response thereto returned, because the replicated request ID may never be evaluated and thus may remain unmarked.

If the batch response is complete at step 1810, step 1812 sends the batch response's data back to the client and step 1814 removes the requestor ID and its mapped-to requested provider ID(s) from the map. Step 1814 returns to FIG. 16 at entry point B (corresponding to step 1612). As described above, at step 1612 the process looks for whether there is another requestor ID with one or more provider requests to match against the current response; if so, the process repeats matching the current response against the next requestor's provider IDs, until no requestor IDs along with their provider IDs remain to be evaluated for this response.

It should be noted that because a response containing provider data is cached, further requests for the same provider will be returned from the cache, at least until expired or otherwise removed from the cache. However, in the event that cache updating is relatively slow, such that the cache cannot be updated before another request for the same provider comes in, then it is feasible to delay removing the request ID from the pending list while also leaving the response in its response data structure for a while. In this way, if another request for that same data comes in, (because the cache had not yet been updated), another request will not be sent (because the request ID is still in the pending request ID list), with the request instead able to be satisfied from the response data structure via straightforward detection logic, e.g., by maintaining a delayed removal list and matching incoming requests against this list.

As can be seen, described herein is a technology that allows a client to build a client graph of providers, and make client requests along the graph to obtain provider/object data as needed, including for use in rendering user interface elements. The technology allows for batching client requests to a data service, multiplexing requests and receiving expanded data in response to a request.

One or more aspects are directed towards building a client provider graph comprising a plurality of providers, in which each provider has provider data. Aspects include accessing the data of one provider that has a reference set containing one or more references that each identifies another provider, making a client request for other provider data corresponding to provider(s) identified in the reference set, and receiving the other provider data in response to the client request. One or more user interface objects are rendered based upon provider data of at least part of the client provider graph.

Making the client request for the other provider data may include communicating with a data service. This may include batching a plurality of requests into a batch request to a data service, and receiving a streamed response from the data service corresponding to the batch request. Making the client request for the other provider data may include multiplexing the client request with another client request for a same provider into a multiplexed request to a data service, receiving a response corresponding to the multiplexed request from the data service, and de-multiplexing the response to return one response to the client request and another response to the other client request. The other provider data may correspond to at least two providers identified in the reference set, and making the client request may include making a requestor batch request. A batch response may be returned to the requestor batch request, including building one part of the batch response with provider data from a client cache, and communicating with a data service to obtain provider data for another part of the batch response.

Expanded data may be received in response to the client request, in which the expanded data corresponds to a provider that was not requested in the client request. The expanded data may be maintained in a partially hydrated state in a client cache. The expanded data in the partially hydrated state may be parsed into object data in a hydrated state, and maintained as object data in the hydrated state in the cache. Provider information may be maintained in a client cache, including maintaining a first provider in a dehydrated state corresponding to needing at least some provider data, maintaining a second provider in a partially hydrated state corresponding to having provider data in an unparsed provider data form, and maintaining a third provider in a hydrated state corresponding to having data in a parsed object form.

One or more aspects are directed towards a client software platform on a client device, in which the client software platform includes a request manager that communicates with a data service to obtain one or more providers from the data service. Each provider includes associated provider data, and at least some of the providers each include a reference set in its associated provider data that references one or more other providers, to form a client graph. A cache is coupled to the request manager to maintain the providers obtained by the request manager. A plurality of user interface objects correspond to the providers, including a user interface object that requests data associated with its corresponding provider, and receives and uses the provider's associated data to display a rendered representation of at least one user interface element on a user interface. The user interface object further requests one or more other providers based upon a reference set in its corresponding provider's associated data.

The user interface object may be coupled to the request manager to request provider data; to respond to the request, the request manager may obtain the provider data from the cache if the provider data is cached, and may obtain the provider data from the data service if not cached. The request manager may batch and multiplex a plurality of requests to the data service. The request manager may batch a plurality of provider requests to the data service in a single batch request, and may receive at least two streamed responses from the data service in response to the single batch request.

In response to a request for an identified provider from the batch manager to the data service, the data service may return the provider and an expanded provider that is not identified in the request. The expanded provider may be cached in a partially hydrated state until data of that expanded provider is requested by a user interface object.

One or more aspects are directed towards maintaining a plurality of providers, in which at least some of the providers each contain a reference set that references at least one other provider to form a graph of providers. A client request is made for provider data corresponding to an identified provider, in which the request includes a provider identifier. The provider data for the identified provider is received in a response to the request, in which the response includes provider data including the identified provider's identifier and other provider data of the identified provider; the other provider data includes a reference set comprising at least one reference to another provider.

Another identified provider may be selected from the reference set to make another client request for the other identified provider. The provider data may be cached in a client cache, including determining a cache location based upon the provider identifier, and writing at least some of the provider data to the cache location. The client request for the provider data may be part of a batch request to a data service; receiving the response may include receiving the provider data in a streamed partial response to the batch request from the data service.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 19 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 19:
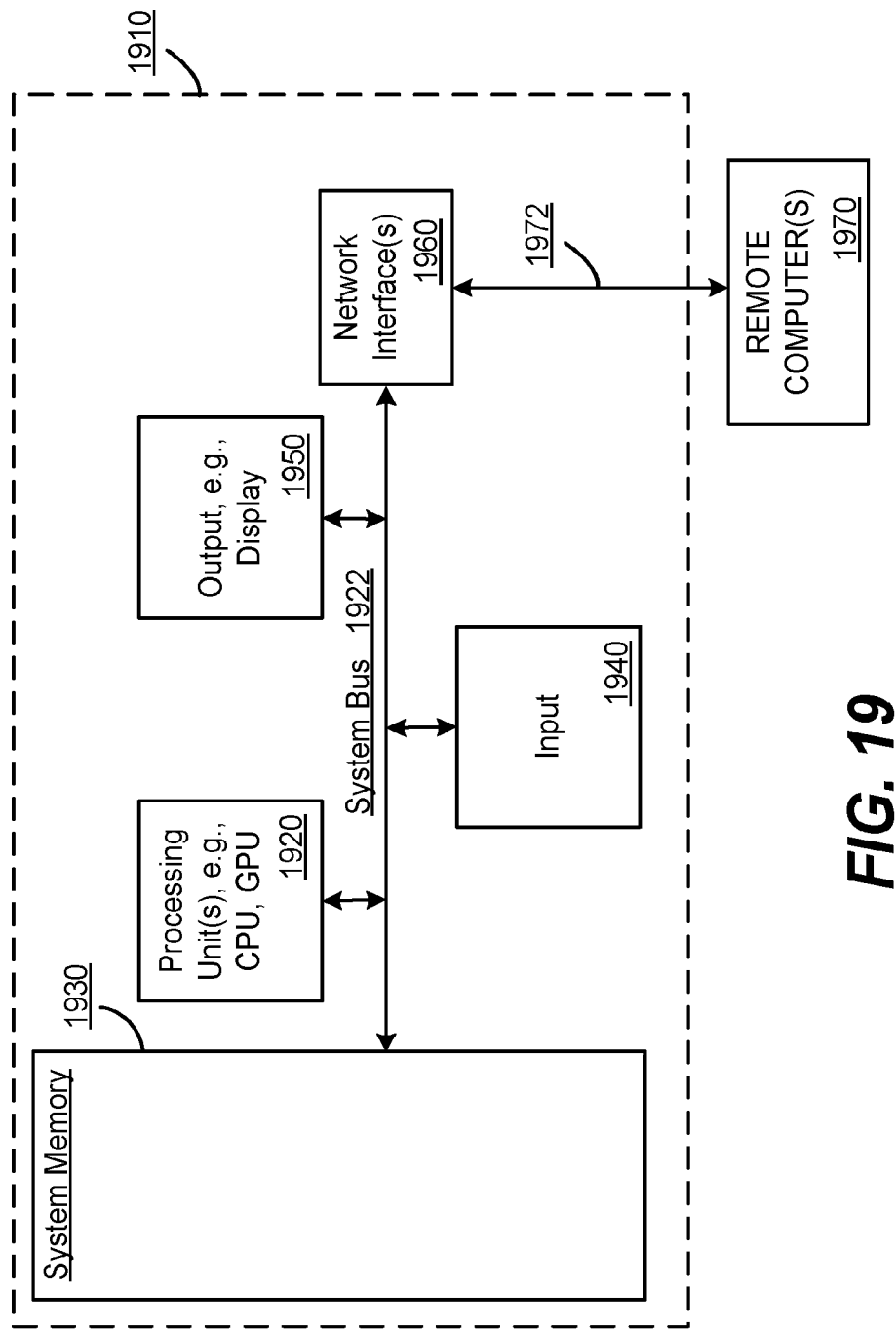
FIG. 19 is a block diagram representing an example computing environment into which aspects of the subject matter described herein may be incorporated.

FIG. 19 thus illustrates an example of a suitable computing system environment 1900 in which one or aspects of the implementations described herein can be implemented, although as made clear above, the computing system environment 1900 is only one example of a suitable computing environment and is not intended to suggest any limitation as to scope of use or functionality. In addition, the computing system environment 1900 is not intended to be interpreted as having any dependency relating to any one or combination of components illustrated in the example computing system environment 1900.

With reference to FIG. 19, an example device for implementing one or more implementations includes a general purpose computing device in the form of a computer 1910. Components of computer 1910 may include, but are not limited to, a processing unit 1920, a system memory 1930, and a system bus 1922 that couples various system components including the system memory to the processing unit 1920.

Computer 1910 typically includes a variety of machine (e.g., computer) readable media and can be any available media that can be accessed by a machine such as the computer 1910. The system memory 1930 may include computer storage media in the form of volatile and/or nonvolatile memory such as read only memory (ROM) and/or random access memory (RAM), and hard drive media, optical storage media, flash media, and so forth. By way of example, and not limitation, system memory 1930 may also include an operating system, application programs, other program modules, and program data.

A user can enter commands and information into the computer 1910 through one or more input devices 1940. A monitor or other type of display device is also connected to the system bus 1922 via an interface, such as output interface 1950. In addition to a monitor, computers can also include other peripheral output devices such as speakers and a printer, which may be connected through output interface 1950.

The computer 1910 may operate in a networked or distributed environment using logical connections to one or more other remote computers, such as remote computer 1970. The remote computer 1970 may be a personal computer, a server, a router, a network PC, a peer device or other common network node, or any other remote media consumption or transmission device, and may include any or all of the elements described above relative to the computer 1910. The logical connections depicted in FIG. 19 include a network 1972, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
    building, by a client device comprising a processor, a client provider graph comprising a customized subset of providers for the client device from a plurality of providers available from a data service operating on at least one server, each provider having provider data, wherein the building comprises an iterative process of:
        accessing the data of one provider in response to a user navigation input, the data of the one provider including a reference set containing references that each identify another provider of the plurality of providers,
        making a client request to the data service for other provider data corresponding to other providers associated with the references identified in the reference set, and
        receiving the other provider data in response to the client request, wherein the other provider data comprises first provider data for a first provider of the other providers, and second provider data for a second provider of the other providers, and wherein the first provider data is in a dehydrated state that comprises a first identifier of the first provider and does not comprise information about objects of the first provider, and the second provider data is in a hydrated state that comprises a second identifier and parsed object data of an object of the second provider; and
    rendering, on a display of the client device, a customized user interface comprising one or more user interface objects based upon provider data of at least part of the client provider graph.

2. The method of claim 1, wherein the customized user interface is customized for a user providing the user navigation input.

3. The method of claim 1, wherein the other provider data corresponds to at least two other providers identified in the reference set, and wherein making the client request comprises making a requestor batch request.

4. The method of claim 3, further comprising, returning a batch response to the requestor batch request, including building one part of the batch response with provider data from a client cache, and communicating with the data service to obtain provider data for another part of the batch response.

5. The method of claim 1, wherein the making the client request for the other provider data comprises batching a plurality of requests into a batch request to the data service, and receiving a streamed response from the data service corresponding to the batch request.

6. The method of claim 1, wherein making the client request for the other provider data comprises multiplexing the client request with another client request for a same provider of the one or more other providers into a multiplexed request to the data service, receiving a response corresponding to the multiplexed request from the data service, and de-multiplexing the response to return one response to the client request and another response to the other client request.

7. The method of claim 1, further comprising receiving expanded data in response to the client request, the expanded data corresponding to a provider that was not requested in the client request.

8. The method of claim 7, further comprising maintaining the expanded data corresponding to the provider in a partially hydrated state in a client cache.

9. The method of claim 8, further comprising parsing the expanded data in the partially hydrated state into object data of another object in the hydrated state, and maintaining the object data in the hydrated state in the cache.

10. The method of claim 1, further comprising maintaining provider information in a client cache, including maintaining information of the first provider in the dehydrated state corresponding to needing at least some provider data.

11. A client device comprising:
    a processor; and
    a memory communicatively coupled to the processor, the memory having stored therein computer-executable components, the computer-executable components comprising:
    a request manager configured to:
        build a client provider graph comprising a customized subset of providers for the client device from a plurality of providers available from a data service operating on at least one server, each provider having provider data, wherein the building comprises an iterative process of:
        access the data of one provider in response to a user navigation input, the data of the one provider including a reference set containing references that each identify another provider of the plurality of providers,
        make a client request for other provider data corresponding to other providers associated with the references identified in the reference set, and receive the other provider data in response to the client request, wherein the other provider data comprises first provider data for a first provider of the other providers, and second provider data for a second provider of the other providers, and wherein the first provider data is in a dehydrated state that comprises a first identifier of the first provider and does not comprise information about objects of the first provider, and the second provider data is in a hydrated state that comprises a second identifier and parsed object data of an object of the second provider; and render, on a display of the client device, a customized user interface comprising one or more user interface objects based upon provider data of at least part of the client provider graph.

12. The client device of claim 11, wherein customized user interface is customized for a user providing the user navigation input.

13. The client device of claim 11, wherein the making the client request for the other provider data comprises multiplexing the client request with another client request for a same provider of the one or more other providers into a multiplexed request to the data service, receiving a response corresponding to the multiplexed request from the data service, and de-multiplexing the response to return one response to the client request and another response to the other client request.

14. The client device of claim 11, wherein the request manager is further configured to receive expanded data in response to the client request, the expanded data corresponding to a provider that was not requested in the client request.

15. The client device of claim 11, wherein the request manager is further configured to maintain the expanded data corresponding to the provider in a partially hydrated state in a client cache.

16. A non-transitory computer-readable medium having instructions stored thereon that, in response to execution, cause a client device including a processor to perform operations comprising:

building a client provider graph comprising a customized subset of providers for the client device from a plurality of providers available from a data service operating on at least one server, each provider having provider data, wherein the building comprises an iterative process of:

accessing the data of one provider in response to a user navigation input, the data of the one provider including a reference set containing references that each identify another provider of the plurality of providers, making a client request to the data service for other provider data corresponding to other providers associated with the references identified in the reference set, and receiving the other provider data in response to the client request, wherein the other provider data comprises first provider data for a first provider of the other providers, and second provider data for a second provider of the other providers, and wherein the first provider data is in a dehydrated state that comprises a first identifier of the first provider and does not comprise information about objects of the first provider, and the second provider data is in a hydrated state that comprises a second identifier and parsed object data of an object of the second provider; and rendering, on a display of the client device, a customized user interface comprising one or more user interface objects based upon provider data of at least part of the client provider graph.

17. The non-transitory computer-readable medium of claim 16, wherein the customized user interface is customized for a user providing the user navigation input.

18. The non-transitory computer-readable medium of claim 16, wherein the wherein making the client request for the other provider data comprises multiplexing the client request with another client request for a same provider of the one or more other providers into a multiplexed request to the data service, receiving a response corresponding to the multiplexed request from the data service, and de-multiplexing the response to return one response to the client request and another response to the other client request.

19. The non-transitory computer-readable medium of claim 16, wherein the operations further comprise receiving expanded data in response to the client request, the expanded data corresponding to a provider that was not requested in the client request.

20. The non-transitory computer-readable medium of claim 19, wherein the operations further comprise maintaining the expanded data corresponding to the provider in a partially hydrated state in a client cache.

* * * * *